US008678923B2

(12) United States Patent
Radek et al.

(10) Patent No.: US 8,678,923 B2

(45) Date of Patent: Mar. 25, 2014

(54) GAMING MACHINE CHAIR AND WAGERING GAME SYSTEMS AND MACHINES WITH A GAMING CHAIR

(75) Inventors: Paul J. Radek, Naperville, IL (US); Timothy C. Loose, Chicago, IL (US); Edward G. Brunell, Chicago, IL (US); Vito M. Caporusso, Downers Grove, IL (US)

(73) Assignee: WMS Gaming Inc., Waukegan, IL (US)

( * ) Notice: Subject to any disclaimer, the term of this patent is extended or adjusted under 35 U.S.C. 154(b) by 204 days.

(21) Appl. No.: 13/282,756

(22) Filed: Oct. 27, 2011

(65) Prior Publication Data

US 2012/0108333 A1 May 3, 2012

Related U.S. Application Data

(60) Provisional application No. 61/409,164, filed on Nov. 2, 2010.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................................. 463/36; 463/46; 463/47

(58) Field of Classification Search

USPC .......................................................... 463/36

See application file for complete search history.

(56) References Cited

U.S. PATENT DOCUMENTS

| | | | | |
|---|---|---|---|---|
| 4,477,069 | A * | 10/1984 | Crudgington, Jr. | 472/60 |
| 6,139,324 | A | 10/2000 | Roy et al. | |
| 6,280,328 | B1 | 8/2001 | Holch et al. | |
| 6,392,556 | B2 * | 5/2002 | Tomich | 340/689 |
| 6,517,433 | B2 | 2/2003 | Loose et al. | |
| 6,585,515 | B1 | 7/2003 | Roy et al. | |
| 6,659,773 | B2 | 12/2003 | Roy et al. | |
| 6,662,560 | B2 | 12/2003 | Roy et al. | |
| D559,328 | S | 1/2008 | Rasmussen et al. | |
| 7,321,799 | B2 | 1/2008 | Pillard | |
| 7,367,886 | B2 | 5/2008 | Loose et al. | |
| 7,479,063 | B2 | 1/2009 | Pryzby et al. | |
| 7,766,747 | B2 | 8/2010 | Bonney et al. | |

(Continued)

FOREIGN PATENT DOCUMENTS

| | | | |
|---|---|---|---|
| JP | 2006-102288 | 4/2006 | A63F 13/00 |
| WO | WO 2005/117648 | 5/2005 | |

(Continued)

*Primary Examiner* — Dmitry Suhol

*Assistant Examiner* — Kevin Y Kim

(74) *Attorney, Agent, or Firm* — Nixon Peabody LLP

(57) ABSTRACT

Gaming machine chairs and wagering game systems and machines with a gaming chair are presented herein. One aspect of the present disclosure is directed to an automated gaming chair for a gaming system that conducts a wagering game. The gaming chair includes a seat portion and a backrest portion that are supported by a base. The seat portion includes one or more sensing devices for detecting the position of the player relative to the seat portion. The backrest portion includes one or more sensing device for detecting the position of the player relative to the backrest portion. The gaming chair also includes at least one actuator for automating movement of the gaming chair. The actuator(s) limits one or more ranges of motion within which the gaming chair is moved based upon the position of the player as detected by the sensing devices of the seat portion and backrest portion.

23 Claims, 9 Drawing Sheets

(56) References Cited

U.S. PATENT DOCUMENTS

| | | | |
|---|---|---|---|
| 2003/0045354 | A1 | 3/2003 | Giobbi |
| 2004/0229192 | A1 | 11/2004 | Roy et al. |
| 2006/0256234 | A1 | 11/2006 | Roy et al. |
| 2006/0256972 | A1 | 11/2006 | Roy et al. |
| 2007/0021218 | A1* | 1/2007 | Okada ............................ 463/47 |
| 2007/0035164 | A1* | 2/2007 | North ......................... 297/217.1 |
| 2007/0122793 | A1 | 5/2007 | Orban et al. |
| 2007/0270216 | A1 | 11/2007 | Pryzby |
| 2008/0039215 | A1 | 2/2008 | Hahn |
| 2008/0054561 | A1* | 3/2008 | Canterbury et al. ...... 273/148 B |
| 2008/0109265 | A1 | 5/2008 | Roy et al. |
| 2008/0211276 | A1 | 9/2008 | Rasmussen |
| 2011/0003631 | A1 | 1/2011 | Tastad |
| 2011/0111839 | A1 | 5/2011 | Lesley et al. |
| 2011/0111847 | A1 | 5/2011 | Lesley et al. |

FOREIGN PATENT DOCUMENTS

| | | |
|---|---|---|
| WO | WO 2005/117649 | 5/2005 |
| WO | WO 2007/143849 | 12/2007 |
| WO | WO 2008/049217 | 5/2008 |
| WO | WO 2011/060331 | 11/2010 |

* cited by examiner

GAMING MACHINE CHAIR AND WAGERING GAME SYSTEMS AND MACHINES WITH A GAMING CHAIR

CROSS-REFERENCE AND CLAIM OF PRIORITY TO RELATED APPLICATION

This application claims the benefit of and priority to U.S. Provisional Patent Application No. 61/409,164, filed Nov. 2, 2010, which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present disclosure relates generally to wagering game machines and gaming systems. More particularly, the present disclosure relates to gaming chairs, as well as wagering game machines and systems with one or more gaming chairs.

BACKGROUND

Gaming machines, such as slot machines, video poker machines, and the like, have been a cornerstone of the gaming industry for several years. Generally, the popularity of such machines with players is dependent on the likelihood (or perceived likelihood) of winning money at the machine, as well as the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Consequently, shrewd operators strive to employ the most entertaining and exciting machines, features, and enhancements available because such machines attract frequent play and, hence, increase profitability to the operator.

Heretofore, gaming machine design and innovation has focused primarily on attraction devices, lighting, payout mechanisms, networking, and predominantly on game play, such as base game characteristics and enhancements, bonus rounds, and progressive-type game play. Gaming chairs have received less attention, with such attention being generally limited to improving player comfort and convenience. Even less attention has been paid to automating chair positioning and improving other tactile features.

While player comfort has been addressed to some extent, typically, it has been isolated to chair ergonomics and the incorporation of adjustable features (e.g. pivotable arm rests, stowable cup holders, etc.). For instance, players typically cannot sit back in the gaming chair and relax in comfort because the game play buttons are located on the gaming machine requiring most users to lean forward. Materials used to promote comfort for individuals maintaining a prone, seated position for extended periods of time have been incorporated to alleviate discomfort and create an environment that enhances the gaming experience.

Convenience features also enhance the enjoyment realized by gaming patrons. For example, stationary footrests, adjustable headrests, and adjustable-height seat cushions allow for players of different sizes and preferences to use and enjoy the same gaming chair. In addition, chair-mounted gaming buttons eliminate the need for players to reach for standard input devices on the cabinet, making the player's gaming experience more comfortable and convenient, and thus more enjoyable.

As the complexity and capacity of microcomputer programs continue to grow, the graphics and audio of wagering games have become more realistic and intense. As a result, different accessories have been provided to enhance the player's audio and visual experiences. Surround-sound speaker systems and high-definition wide-screen displays are just some of the accessories that are available on modern gaming machines to enhance the graphic and acoustic output of wagering games and, thus, increase player enjoyment.

Another recent enhancement for wagering game chairs is automation of the seat of the gaming chair in response to events that occur in the wagering game, so as to simulate such events. Gaming chairs have also been designed with hardware, such as different haptic technologies, for creating game or player initiated tactile sensations. Additional improvements to gaming chair features can add to the value and excitement of the gaming environment.

When using an automated gaming chair, many players do not sit in an ideal or expected manner. For example, some players will sit with their feet raised and resting on the game console or draped over one of the arm rests. Some players may sit at the forward edge of the chair seat away from the backrest. Some players may even sit on their knees with their legs on the chair seat. In addition, it is very common for non-players to sit on or stand next to the gaming chair during game play. In some of these scenarios, the abrupt motion of the chair may be undesirable, uncomfortable, and/or potentially hazardous. Current chair designs are not provided with the requisite hardware to address these issues. Although some current chair designs incorporate a single pressure sensor into the chair seat, these sensors are generally limited to identifying the presence or absence of a player and provide no other information. There is therefore a need for gaming chair designs that address the foregoing problems.

SUMMARY

According to one embodiment of the present disclosure, a gaming system for playing a wagering game is presented. The gaming system includes one or more input devices for receiving a wager from a player to play the wagering game. One or more displays present the outcome of the wagering game, which is randomly determined from a plurality of wagering game outcomes. The gaming machine also includes a gaming chair with a seat portion and a backrest portion that are supported by a base. One or more actuators are operatively attached to the gaming chair and operable to selectively reposition the base, the seat portion, and/or the backrest portion. One or more sensing devices are operable to detect the position of the player relative to the gaming chair. At least one controller is in operative communication with the actuator(s) and the sensing device(s). The at least one controller is configured to reduce a range of motion within which the actuator (s) can reposition the base, seat, and/or backrest portion based upon the position of the player as detected by the sensing device(s).

According to another embodiment of the present disclosure, a gaming system is provided for playing a wagering game. In this embodiment, the gaming system includes an input device for receiving a wager from a player to play the wagering game, and one or more displays for displaying an outcome of the wagering game, which is determined from a plurality of wagering game outcomes. The gaming system also includes a gaming chair, one or more actuators operable to selectively reposition at least a portion of the gaming chair, and one or more sensing devices for detecting the position of the player relative to the gaming chair. At least one controller is in operative communication with the actuator(s), and configured to limit a range of motion within which the actuator(s) can reposition the portion of the gaming chair based, at least in part, upon the position of the player as detected by the at least one sensing device.

According to yet another embodiment of the present disclosure, an automated gaming chair is presented for a wagering game system, such as a gaming machine, a networked gaming terminal, or a handheld gaming device. The gaming chair includes a base, a seat portion supported by the base, and a backrest portion supported by the base. The seat portion includes one or more sensing devices for detecting the position of the player relative to the seat portion. The backrest portion includes one or more sensing devices for detecting the position of the player relative to the backrest portion. At least one actuator is operable to automate movement of the gaming chair. The at least one actuator is adapted to limit at least one range of motion within which the gaming chair is moved based upon the position of the player as detected by the sensing devices of the seat portion and the backrest portion.

According to even yet another embodiment of the present disclosure, a gaming machine for playing a wagering game is featured. The gaming machine includes at least one display configured to display outcomes of the wagering game, and at least one input device configured to receive wagers from a player. The gaming machine also includes a gaming chair with at least one actuator for providing movement to the gaming chair. The gaming chair also includes at least one sensor for sensing a position of the player. The at least one actuator selectively moves the chair based on output signals from the at least one sensor.

The above summary is not intended to represent each embodiment, or every aspect, of the present disclosure. The above features and advantages, and other features and advantages of the present disclosure, will be readily apparent from the following detailed description of the preferred embodiments and best modes for carrying out the invention when taken in connection with the accompanying drawings and appended claims.

Figure 1:
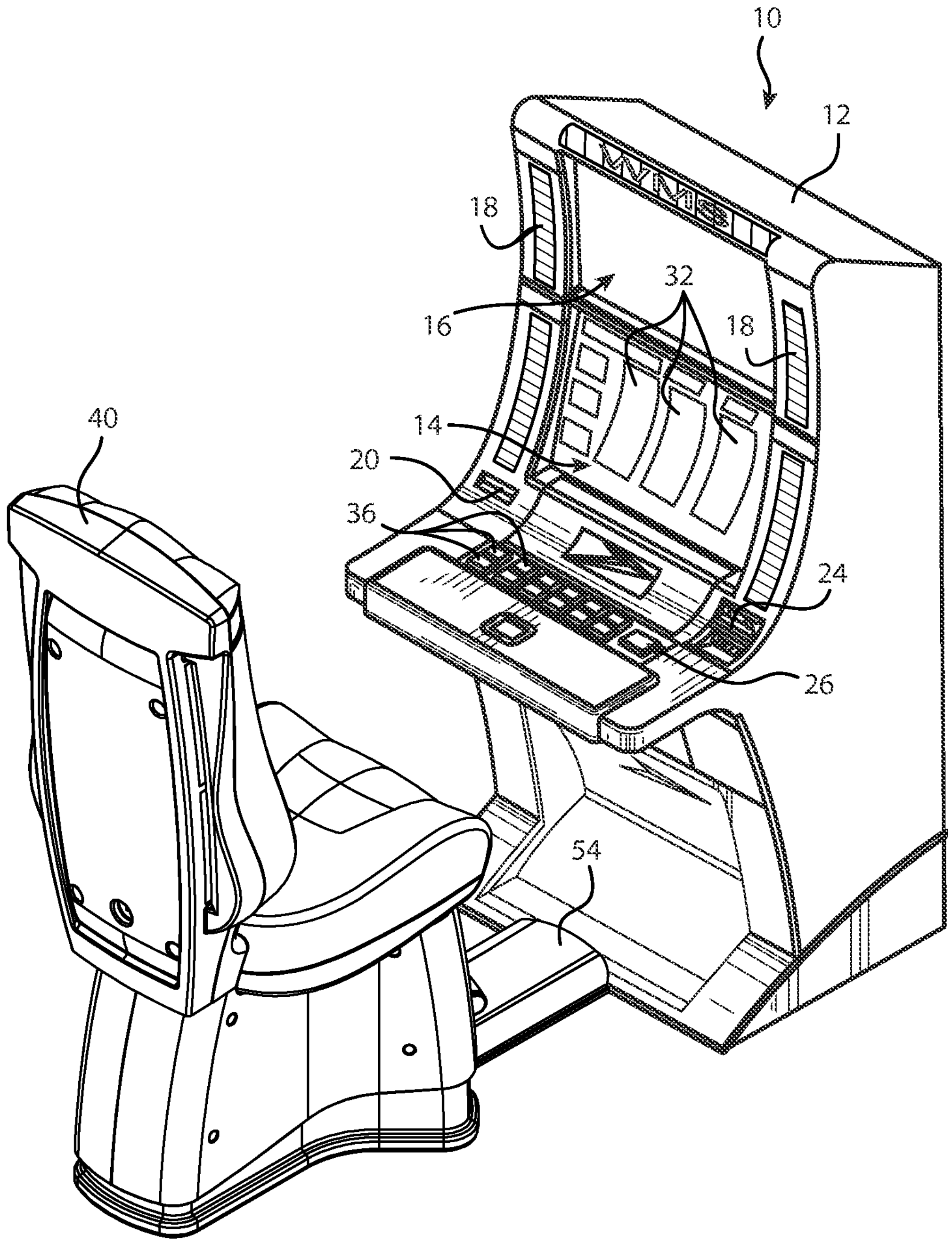
FIG. 1 is a perspective-view illustration of an exemplary gaming machine with a gaming chair in accordance with embodiments of the present disclosure.

While the invention is susceptible to various modifications and alternative forms, specific embodiments have been shown by way of example in the drawings and will be described in detail herein. It should be understood, however, that this disclosure is not intended to be limited to the particular forms disclosed. Rather, the invention is to cover all modifications, equivalents, and alternatives falling within the spirit and scope of the invention as defined by the appended claims.

DETAILED DESCRIPTION OF THE EXEMPLARY EMBODIMENTS

While this invention is susceptible of embodiment in many different forms, there are shown in the drawings and will herein be described in detail representative embodiments of the invention with the understanding that the present disclosure is to be considered as an exemplification of the principles of the invention and is not intended to limit the broad aspect of the invention to the embodiments illustrated. To that extent, elements and limitations that are disclosed herein, for example, in the Abstract, Summary of the Invention, and Detailed Description of the Embodiments sections, but not explicitly set forth in the claims, should not be incorporated into the claims, singly or collectively, by implication, inference or otherwise.

Referring to FIG. 1, a perspective-view illustration of an exemplary gaming terminal 10 (also referred to herein as "wagering game machine" or "gaming machine") is shown in accordance with one embodiment of the present disclosure. The gaming terminal 10 of FIG. 1 may be used, for example, in traditional gaming establishments, such as casinos, and non-traditional gaming establishments, such as pools, hotels, restaurants, and airports. With regard to the present disclosure, the gaming terminal 10 may be any type of gaming terminal and may have varying structures and methods of operation. For instance, the gaming terminal 10 may be an electromechanical gaming terminal configured, for example, to play mechanical slots, or it may be an electronic gaming terminal configured, for example, to play a video casino game, such as slots, keno, poker, blackjack, roulette, craps, etc. It should be understood that although the gaming terminal 10 is shown as a free-standing gaming terminal of the upright type, the gaming machines of the present disclosure may take on a wide variety of other forms, such as free-standing gaming terminals of the slant-top type, "countertop" gaming devices, hand-held or portable gaming devices, etc. Finally, the drawings presented herein are not to scale and are provided purely for instructional purposes; as such, the individual and relative dimensions shown in the drawings are not to be considered limiting.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor (not shown), one or more information readers 24, one or more player-input devices 26, and one or more player-accessible ports 28 (e.g., an audio output jack for headphones, a video headset jack, a wireless transmitter/receiver, etc., shown in FIG. 2). While these typical components found in the gaming terminal 10 are described below, it should be understood that numerous additional/alternative peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in commonly owned U.S. Pat. No. 6,517,433, to Loose et al., entitled "Reel Spinning Slot Machine with Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10.

Figure 3:
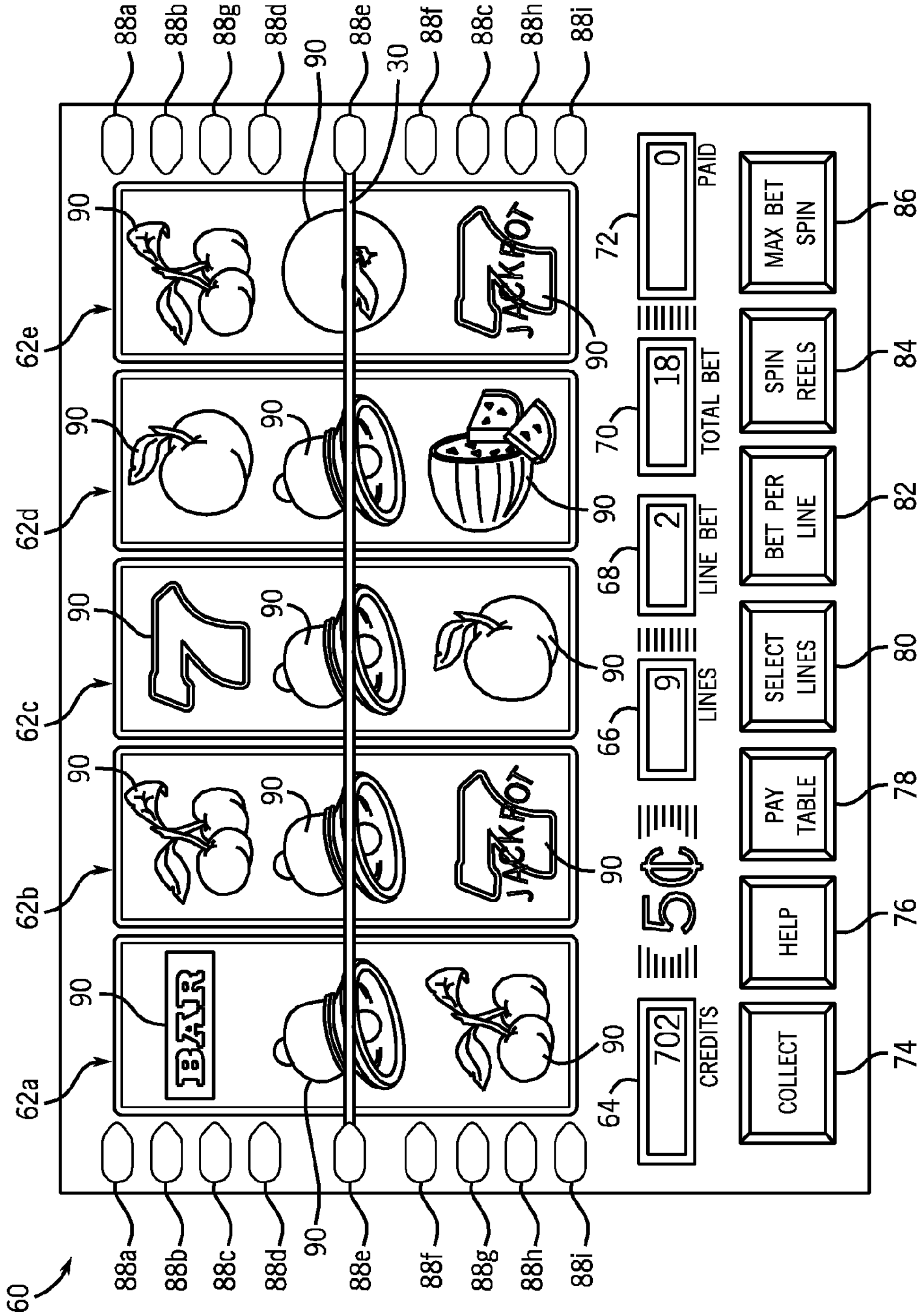
FIG. 3 is a screen shot of a basic-game screen of an exemplary wagering game that can be played on the gaming machine of FIG. 1 and/or the gaming system of FIG. 2.

As seen, for example, in FIG. 3, the primary display area 14 may include one or more paylines 30 extending along a portion thereof. In some embodiments, the primary display area 14 comprises a plurality of mechanical reels (shown with hidden lines at 32) and a video display 34 such as a transmissive display (or a reflected image arrangement in other embodiments) in front of the mechanical reels 32. If the wagering game conducted via the gaming terminal 10 relies upon the video display 34 only, and not the mechanical reels 32, the mechanical reels 32 may be removed from the interior of the terminal 10 and the video display 34 may be of a non-transmissive type (featured below in a representative embodiment in FIG. 3). In contrast, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include, for example, a plurality of buttons 36 on a button panel. In addition, or as an alternative thereto, a touch screen may be mounted over the primary display area 14 and/or the secondary display area 16 and having one or more soft touch keys, as exemplified in FIG. 3. The player-input devices 26 may further comprise technologies that do not rely upon touching the gaming terminal, such as speech-recognition technology, movement- and gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed, for example, in U.S. Patent Application Publication No. 2003/0045354, entitled "Portable Data Unit for Communicating with Gaming Machine Over Wireless Link," which is incorporated herein by reference in its entirety. The account may be stored directly on the portable medium, or at an external system 46 (see FIG. 2) as more fully disclosed, for example, in U.S. Pat. No. 6,280,328, to Holch et al., entitled "Cashless Computerized Video Game System and Method," which is incorporated herein by referenced in its entirety. To enhance security, the individual carrying the portable medium may be required to enter a secondary independent authenticator (e.g., password, PIN number, biometric, etc.) to access their account.

FIG. 1 depicts the gaming machine 10 with an attached gaming chair 40. The gaming chair 40 is located in operational proximity of the gaming machine 10. For instance, in the illustrated embodiment of FIG. 1, the gaming chair 40 is mounted to the gaming floor immediately adjacent and in opposing relation to the gaming machine 10. The gaming chair 40 is operable to receive and process signals from the gaming machine 10. In this example, the gaming chair 40 is electrically and mechanically coupled to the gaming machine 10 via a sled 54. Alternatively, the gaming chair 40 may be detachably coupled to the gaming machine 10 or may lack any physical connection with the gaming machine 10. As additional design options, the gaming chair 40 may be operatively coupled to the gaming machine 10 via alternative means, such as a wireless interface (e.g., infrared, radio, laser, or other wireless communication technologies) or other hard line connections (e.g., fiber optic cabling). Also, as described below, the gaming chair 40 may be automated to provide, for example, simulated motions related to events occurring during game play.

Figure 2:
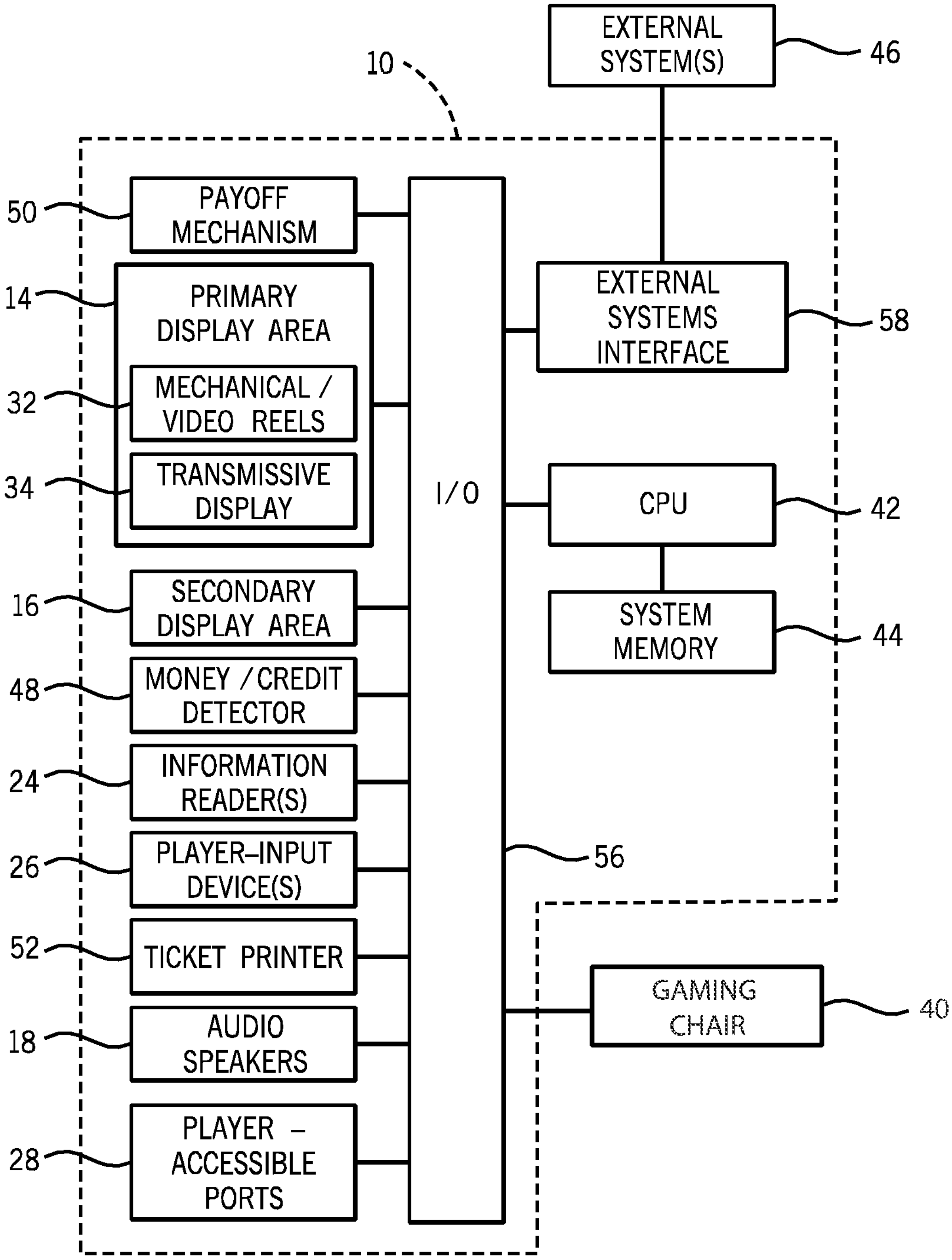
FIG. 2 is a schematic diagram of an exemplary gaming system with a gaming chair in accordance with embodiments of the present disclosure.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device(s). The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and/or multiple program memories. The money/credit detector 48 signals the processor 42 that money and/or credits have been input via a value-input device, such as the bill validator 20 or coin acceptor 22 of FIG. 1, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, the gaming chair 40, and a payoff mechanism 50. The payoff mechanism 50 is operable, for example, in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

In some embodiments, the controller 42 is also connected to, and controls, the gaming chair 40. For example, the controller 42 can regulate the actuation and modulation of one or more actuators (discussed below with respect to FIGS. 6-8) inside the gaming chair 40 to move the chair in correlation with events occurring in the wagering game. Moreover, the controller 42 may be designed to regulate an emotive lighting assembly packaged in the backrest assembly of the gaming chair 40 to create a preferred gaming ambiance and/or a predetermined gaming experience. To this regard, the audio output of a speaker package in the gaming chair 40 may also be controlled by the controller 42, as discussed below with respect to FIG. 8.

Communications between the controller 42 and both the peripheral components of the gaming terminal 10 and the external system 46 occur through input/output (I/O) circuit 56, which can include any suitable bus technologies, such as an AGTL+ front side bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 may be connected to an external system interface 58, which is connected to the external system 46. In this exemplary configuration, the controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

The controller 42 of FIG. 2 comprises any combination of hardware, software, and/or firmware now known or hereinafter developed that may be disposed or reside inside and/or outside of the gaming terminal 10, and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Security features may be advantageously utilized where the gaming machine 10 communicate wirelessly with external systems 46, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S.

Department of Commerce, Special Publication (SP) 800-97, ESTABLISHING WIRELESS ROBUST SECURITY NETWORKS: A GUIDE TO IEEE 802.11, and SP 800-48, WIRELESS NETWORK SECURITY: 802.11, BLUETOOTH AND HANDHELD DEVICES, both of which are incorporated herein by reference in their entireties.

Referring now to FIG. 3, an image of a basic-game screen 60 adapted to be displayed on the primary display area 14 of FIG. 1 is illustrated, according to one embodiment of the present disclosure. A player begins play of a basic wagering game by providing a wager (e.g., inserting a cash note or substitute currency media into the validator 20, and/or inserting a player-card into information reader 24). A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present disclosure does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation, animation, or other indicia, and may further include a "blank" symbol.

Symbol combinations may be evaluated as line pays or "scatter pays". Line pays may be evaluated left to right, right to left, top to bottom, bottom to top, or any combination thereof by evaluating the number, type, or order of symbols 90 appearing along an activated payline 30. Scatter pays, on the other hand, are evaluated without regard to position or paylines, and only require that such combination appears anywhere on the reels 62*a-e*. While an embodiment with nine paylines is shown, a wagering game with no paylines, a single payline, or any plurality of paylines will also work with the present disclosure. Additionally, though an embodiment with five reels is shown, a gaming terminal with any plurality of reels may also be used in accordance with the present disclosure.

Figure 4:
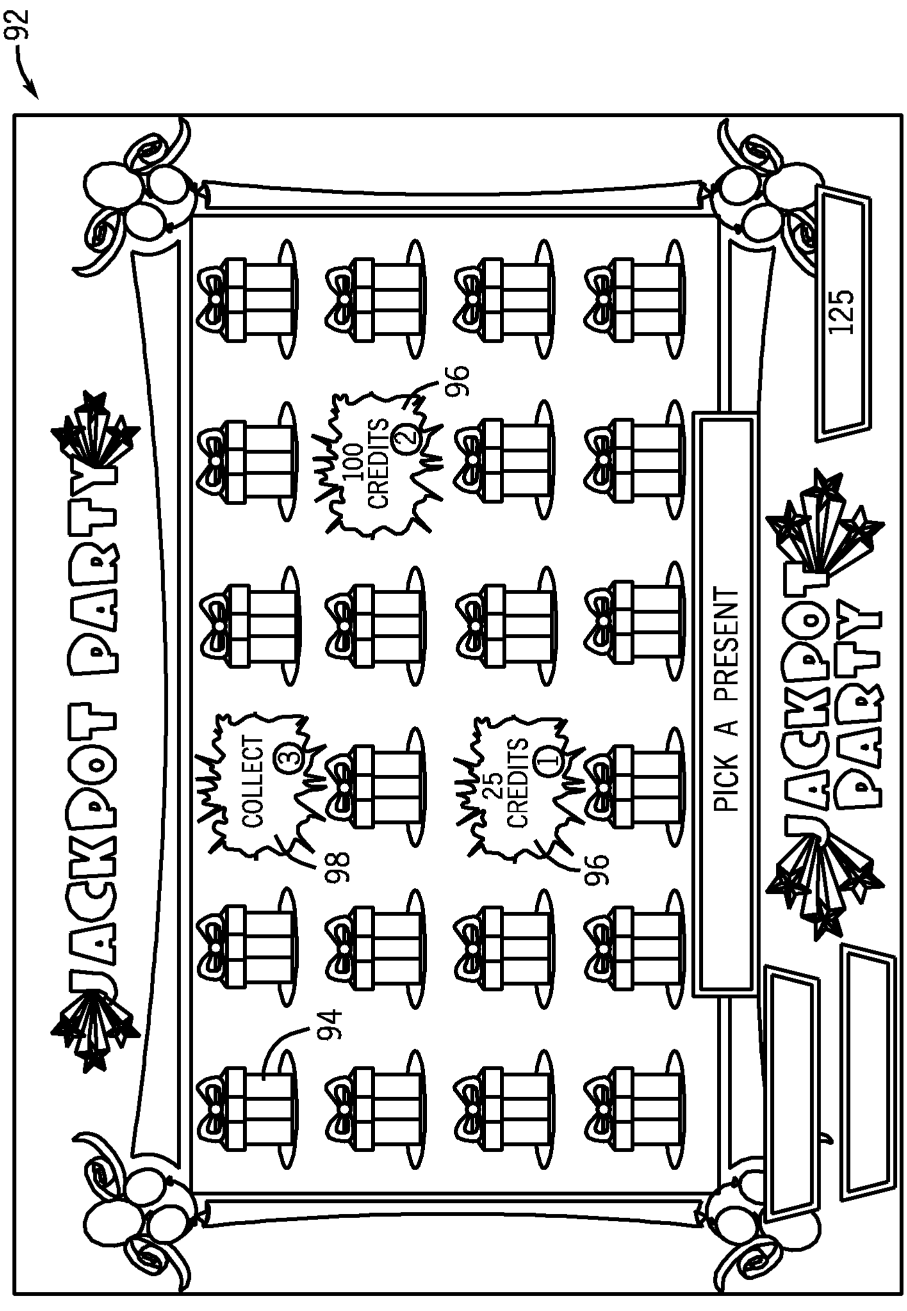
FIG. 4 is a screen shot of a bonus-game screen of an exemplary wagering game that can be played on the gaming machine of FIG. 1 and/or the gaming system of FIG. 2.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
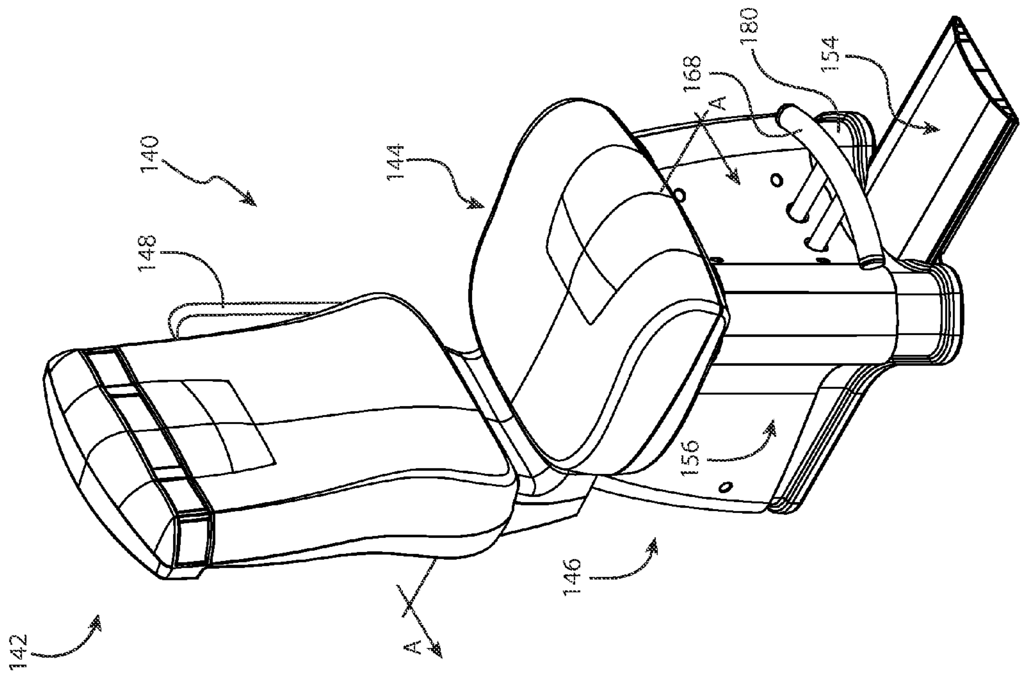
FIG. 5 is a front perspective-view illustration of an exemplary gaming machine chair in accordance with embodiments of the present disclosure.

Referring now to FIG. 5, a perspective-view illustration of a gaming chair, designated generally as 140 (also referred to herein as "gaming machine chair"), for a wagering game system, wagering game machine, and/or wagering game device is presented in accordance with embodiments of the present disclosure. The gaming chair 140 generally includes a backrest assembly (or "seatback" or "backrest portion") 142 and a seat assembly (or "seat bottom" or "seat portion") 144, both of which are functionally supported on a platform assembly, indicated generally at 146 in FIGS. 5 and 6. The seat and backrest portions 142, 144 may be swivel mounted to the platform assembly 146 to ease entry to and alighting from the gaming chair. Moreover, the height and angle of the backrest portion 142 and the seat portion 144 may be individually and/or collectively adjustable.

Communication between the gaming chair 140 and a gaming machine, such as gaming terminal 10 of FIG. 1, or gaming system, such as the exemplary gaming system of FIG. 2, may be accomplished in a variety of ways, including wireless transceivers, direct connectivity, or otherwise. Similar to the embodiment of FIG. 1, for example, the gaming chair 140 of FIG. 5 includes a sled 154 with an internal wiring harnesses (not visible in the views provided), which together electrically and mechanically couple the gaming chair 140 to the gaming machine or system. The gaming chair 140 may also be operable to receive input from a player through various input devices, such as a button panel, joystick, mouse, or motion sensor(s) (not shown), located, for example, on a pivotable armrest 148 (only one of which is shown in FIG. 5, but an identical counterpart may be pivotably attached to the opposing side of the seatback portion 142). Other features may include, but are not limited to, a ticket printer, a card read/write device, a cup holder, foldout tray, a headphone jack, volume controls, brightness controls, cushion heaters, and a retractable tape for restricting use of the gaming chair 140 and/or corresponding gaming machine/system. Additional gaming chair features and design options are disclosed in commonly-assigned U.S. Patent Application Publication No. 2008/0054561 A1, to Stephen A. Canterbury et al., filed in the U.S. on Sep. 21, 2007 and entitled "Gaming Machine Chair," which is incorporated herein by reference in its entirety.

Figure 6:
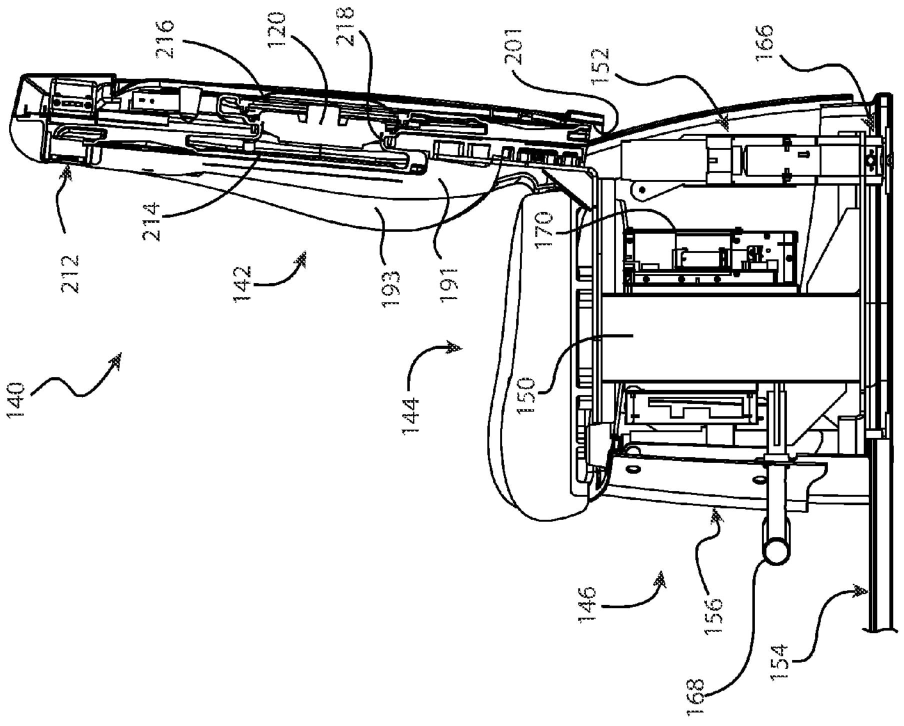
FIG. 6 is a side-view illustration of the gaming machine chair of FIG. 5 taken in partial cross-section along line A-A.
Figure 7:
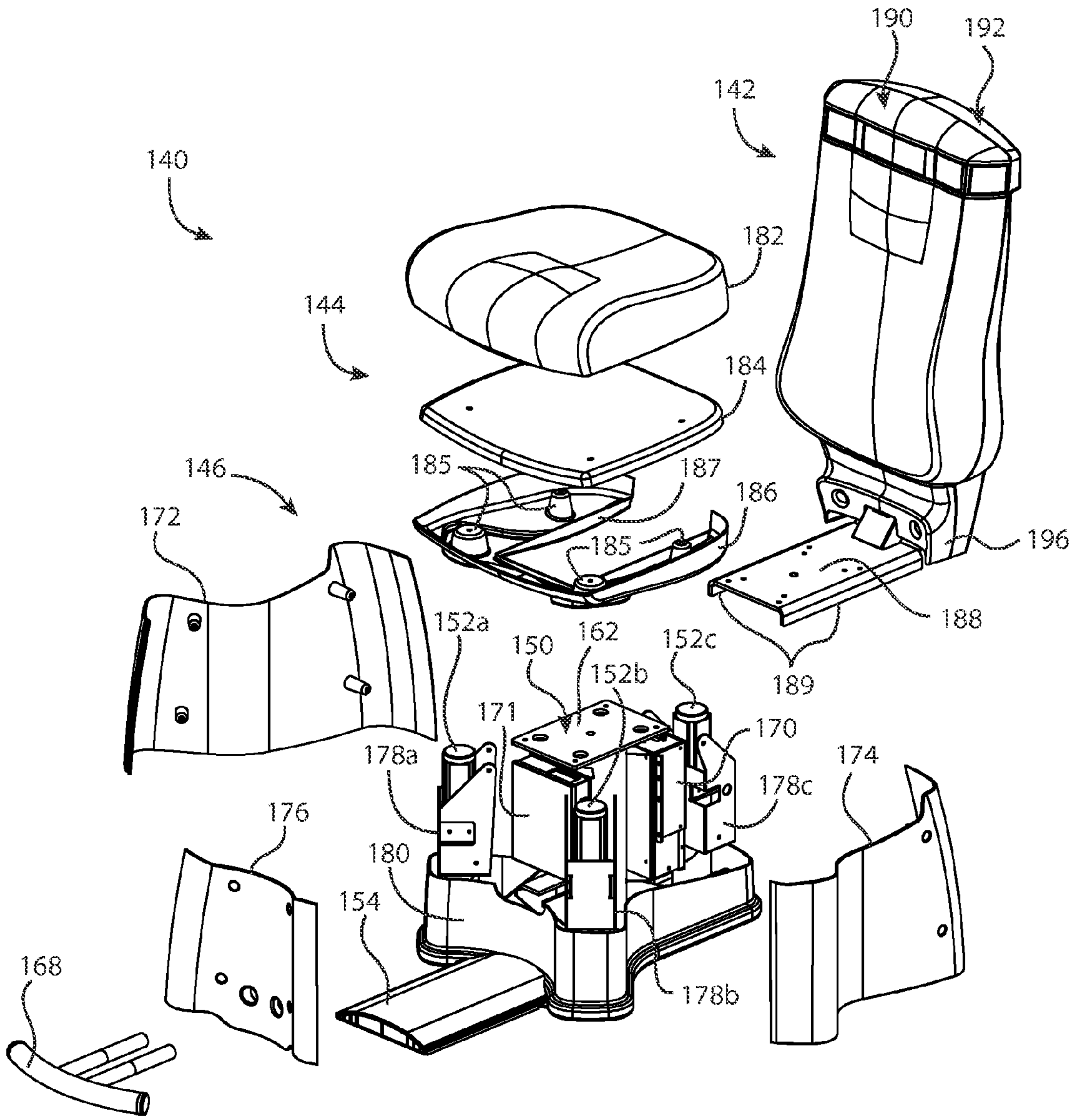
FIG. 7 is a partially-exploded perspective-view illustration of the gaming machine chair of FIG. 5.

Referring now to FIGS. 6 and 7, the platform assembly, designated generally as 146, provides functional and operational support for the backrest and seat assemblies 142, 144. In one exemplary configuration, the platform assembly 146 comprises a base 150, one or more actuators 152, and a movable shroud 156. According to the illustrated embodiment, three actuators 152—e.g., first, second, and third brushless DC motors with ball screws 152*a*, 152*b* and 152*c*, respectively, are packaged under the seat portion 144. It is contemplated that the gaming chair 140 comprises more or fewer than three actuators, such actuators taking on any of a variety of alternative constructs (e.g., pneumatic cylinders, hydraulic cylinders, electric actuators, electromechanical actuators, smart materials, linear actuators, etc.).

Figure 9:
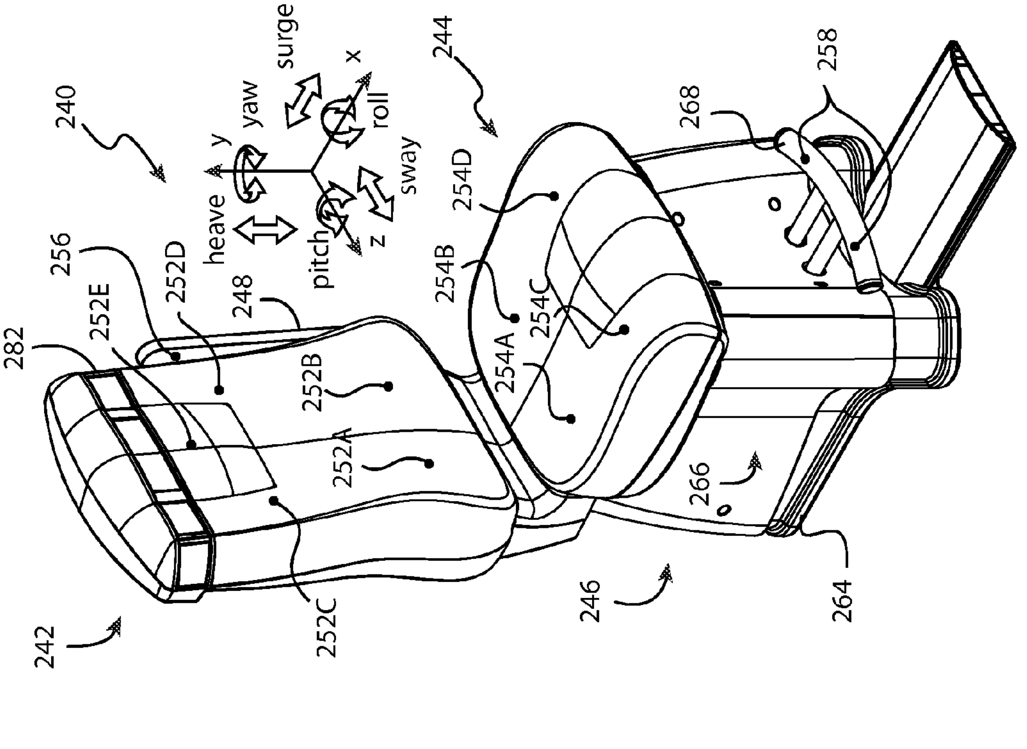
FIG. 9 is a front perspective-view illustration of a gaming machine chair in accordance with embodiments of the present disclosure.

The actuators 152 are operatively attached to, and selectively actuable for moving, the gaming chair seat and backrest assemblies 142, 144. For example, the actuators 152 may be directly or indirectly coupled to the gaming chair seat assembly 142 and/or the backrest assembly 144, as developed further below. In some embodiments of the present disclosure, the actuators 152 respond to signals received by a motion controller 170 from the gaming machine (e.g., FIG. 1) and/or gaming system (e.g., FIG. 2). Optionally, the actuators 152 may also respond to signals from a button panel, joystick, or other player input device on the gaming chair 140. In the exemplary configuration shown, the actuators 152 expand and contract in a sequence or manner that supports, for example, the desired simulated motion presented during game play or requested by the player. The actuators 152 can provide various types of movement, including, but not limited to, heave (upward and downward rectilinear movement), pitch (rotational movement about a lateral axis), and roll (rotational movement about a longitudinal axis), which are illustrated in FIG. 9. Accordingly, the gaming chair 140 shown is operable to provide three degrees of freedom (DOF). While one embodiment offers 3-DOF, additional actuators could be added to provide other movements equating to four or more DOF. These other movements may include, for example, surge (forward and rearward rectilinear movement), sway (lateral rectilinear movement), and yaw (rotational movement about a vertical axis). Alternatively, if fewer actuators are provided, the gaming chair 140 would offer fewer DOF. In the illustrated embodiment, the chair 140 is also operable to provide other tactile motions, such as, but not limited to, vibrations, shaking, pulsations, etc.

The motion controller 170 is manufactured with the appropriate hardware and software to respond to signals from the gaming machine (e.g., CPU 42 of FIG. 2) and/or the gaming system (e.g., external system 46 of FIG. 2) as directed by the gaming software, or to respond to input from the player, and controls automated functions provided by the gaming chair 140. For example, in one embodiment, the motion controller 170 includes a printed circuit board (PCB) with various components, such as a microprocessor. The motion controller 170 is enclosed in a grounded material suitable to shield the motion controller 170 from external interference such as electrostatic, radio frequency, and magnetic energy. The enclosure, as seen in FIGS. 7 and 8, could be a box constructed of, but not limited to, aluminum, copper, zinc plated steel, synthetic and natural polymers, etc.

The base 150, which may also be referred to as "weldment," includes structure for coupling to the various actuators 152. In the illustrated embodiment of FIG. 8, for example, the base 150 comprises three legs, namely first, second, and third elongated, U-shaped legs 158*a*, 158*b* and 158*c*, respectively. Each of the legs 158 is designed to attach to a respective one of the actuators 152. By way of example, and not limitation, the legs 158*a*, 158*b*, 158*c* project outward from a first end of an elongated, cylindrical shaft 160. In this example, each leg 158 extends generally orthogonally from the cylindrical shaft 160 such that the legs 158*a-c* are disposed in a triangular-arrangement. Each leg 158 has a complementary bore hole (not visible in the views provided) through which a respective actuator passes and locks to the base 150 (e.g., via threaded coupling, fasteners, welding, etc.). Recognizably, the number, shape, dimensions, and orientation of the base legs 158*a-c* may be modified, individually or collectively, to accommodate any number or type of actuators. A second end of the shaft 150 has attached thereto a generally-planar platform 162 at which the seat assembly 144 is mounted to the base 150. In some embodiments, the base 150 is fabricated as a single-piece, unitary structure, fabricated, for example, from a metallic material, such as aluminum or steel, a high-strength resin, such as nylon, or a high-strength polymer, such as polyvinyl chloride (PVC), PIPD, or combinations thereof.

Figure 8:
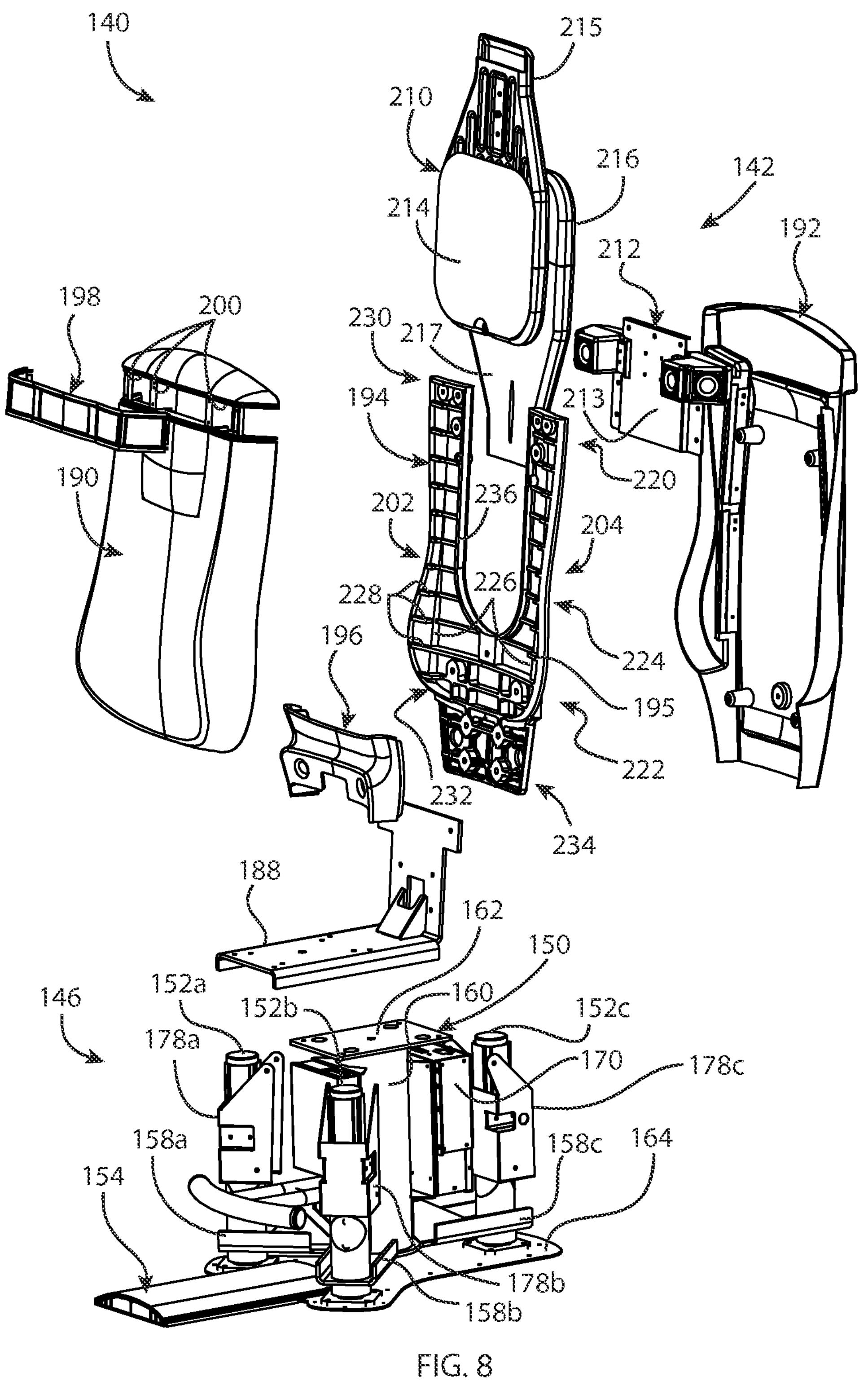
FIG. 8 is an alternative partially-exploded perspective-view illustration of the gaming machine chair of FIG. 5 with the boot, shroud, and seat portion removed.

The gaming chair 140 of FIGS. 5-8 is fixed to and supported on a base plate 164, as best seen in FIG. 8, which, in turn, may be secured (e.g., via bolts) directly to or laid on the floor or commensurate support structure beneath the gaming chair 140. Alternatively, the base plate 164 may be eliminated from the gaming chair construction, wherein which the gaming chair 140 is permanently or releasably fixed directly to a support structure, such as the floor. In one embodiment, the actuators 152 are coupled directly to the chair's support structure. For instance, each of the actuators 152 is pivotably mounted to the base plate 164 via a ball joint 166 (one of which is visible in FIG. 6). The base 150 is attached, as described above, to the various actuators 152. In this particular arrangement, the base 150 lacks a direct connection to the support structure (e.g., base plate 164); rather, the base 150 is movably attached to the base plate 164 via the actuators 152, as seen in FIGS. 8 and 9. In so doing, the base 150, backrest assembly 142 and seat assembly 144 are effectively suspended or perched on the actuators 152, whereby the base 150, backrest 142 and seat 144 are selectively repositioned (e.g., heaved, pitched, rolled, vibrated, etc.) along any of the three Cartesian coordinate axes by the selective actuation, modulation, and/or deactivation of one or more of the actuators 152. The actuators 152 therefore act to support the weight of the gaming chair 140 and the player seated thereon, and also automate (e.g., provide dynamic movement) to the gaming chair 140.

A movable shroud 156 inhibits access to the underside area of the gaming chair 140. As indicated above, and illustrated in FIGS. 6 and 7, the actuators 152 and base 150 are positioned underneath the seat assembly 144. The movable shroud 156, as embodied in FIGS. 5 and 6, projects downward from the underside surface of the seat portion 144, extending in a generally continuous manner around the lower periphery of the seat base, thereby inhibiting access to the region below the seat portion 144 at which the base 150 and actuators 152 are located. In addition, a flexible, stationary boot 180 projects upward from the base plate 164, extending in a generally continuous fashion around the lower-most region of the actuators 152 and base 150, as seen in FIG. 7. The moveable shroud 156 and stationary boot 180 cooperate, as illustrated in FIGS. 5 and 6 and described hereinbelow, to conceal and substantially inhibit access to the underside of the seat assembly 144, protecting players and other patrons from the moving actuators 152, base 150, and other potentially hazardous components of the gaming chair 140 located under the seat assembly 144, and preventing unscrupulous parties from attempting to access the components under the gaming chair seat assembly 144. Recognizably, the relative orientation of the shroud 156 and boot 180 may be switched (i.e., the movable shroud 156 projecting up from the base plate 164 and the stationary boot 180 extending down from the seat assembly) without departing from the intended scope of the presented invention.

The movable shroud 156 embodied in FIG. 7 includes three separate pieces: a right lateral flank ("first flank") 172, a left lateral flank ("second flank") 174, and a front shield 176. Each of the three constituent parts of the movable shroud 156 is operatively attached to one or more of the actuators 152 for concurrent movement therewith. In particular, with reference to FIG. 7, the first flank 172 is mounted to a first bracket **178*a* (e.g., via threaded fasteners) that is rigidly coupled to the first actuator 152*a*, and to a third bracket 178*c* (e.g., via threaded fasteners) that is rigidly coupled to the third actuator 152*c*. Likewise, the second flank 174 is mounted to a second bracket 178*b* (e.g., via threaded fasteners) that is rigidly coupled to the second actuator 152*b*, and to the third bracket 178*c* (e.g., via threaded fasteners) that is rigidly coupled to the third actuator 152*c*. Finally, the front shield 176 is mounted to the first actuator 152*a* via bracket 178*a*, and to the second actuator 152*b* via bracket 178*b*. In a similar regard, the exemplary platform assembly 146 is also provided with a footrest 168 that is optionally attached to actuators 152 via base 150** for concurrent movement therewith.

Although illustrated as three distinct, disconnected pieces, the movable shroud 156 may comprise any number of constituent parts fewer or greater than three. Moreover, each of the shroud pieces may be operatively attached to a single actuator, every actuator, or any combination in between without departing from the intended scope and spirit of the present invention. It is also envisioned that the movable shroud 156 be coupled directly to the base 150 and/or seat assembly 144 so long as movement of the seat assembly 144 is left unimpeded.

Referring to both FIGS. 5 and 7, the moveable shroud 156 and stationary boot 180 cooperate, as briefly described above, to generally conceal and substantially inhibit access to the underside of the seat assembly 144. In one embodiment, the movable shroud 156 is in continuous overlapping engagement with the stationary boot 180, thereby preventing inadvertent insertion of an appendage, extremity, clothing, etc. into the underside compartment of the gaming chair 140 where the moving actuators 152 and base 150 are located. By way of example, the lower portion of the inner surface of the movable shroud 156 (i.e., first flank 172, second flank 174, and front shield 176) overlaps and presses against a corresponding upper portion of the outer surface of the stationary boot 180, as seen in FIG. 5. Alternatively, the lower portion of the outer surface of the movable shroud 156 may overlap and press against a corresponding upper portion of the inner surface of the stationary boot 180. This surface-to-surface engagement extends in a generally continuous manner around the entire upper periphery of the stationary boot 180, as seen in FIG. 5.

The movable shroud 156 is in flexural engagement with the stationary boot 180 to bend the stationary boot 180 during actuation of the actuators 152. By way of explanation, the stationary boot 180 may comprise a flexible material (e.g., an elastomeric thermoplastic polyurethane), whereas the movable shroud 152 is fabricated from a more rigid material (e.g. ABS). Accordingly, when one or more of the actuators 152 are activated (e.g., via motion controller 170), causing the gaming chair 140 to move (e.g., tilt), the movable shroud 156 will exhibit concomitant movement due to the mechanical coupling with the actuators 152 described above. As the movable shroud 156 shifts, the right lateral flank 172, left lateral flank 174, and/or front shield 176 will press inward against a corresponding portion of the boot 180. This flexural engagement minimizes (or perhaps eliminates) gaps between the shroud 156 and boot 180 during movement of the gaming chair, which in turn helps prevent the inadvertent insertion of an appendage or extremity into the underside compartment of the gaming chair 140.

The representative seat portion 144 featured in FIG. 7 is depicted as a three-part assembly, comprising an upper seat cushion 182, an intermediate substrate 184, and a lower trim shell 186. In one embodiment, the upper seat cushion 182 comes preassembled with the intermediate substrate 184. For example, the upper seat cushion 182 is placed on top of the substrate 184, and a cushion cover (not shown) is wrapped around the upper seat cushion 182, over the sides of the substrate 184, and stapled to the underside of the substrate 184. It is also contemplated that the lower trim shell 186 come preassembled with the cushion 182 and/or substrate 184 prior to integration of the seat assembly 144 with the gaming chair 140.

To assemble the seat assembly 144 with the remainder of the gaming chair 140, the L-shaped bracket 188 is first mounted to the platform 162 of the base 150 (e.g., via screws). Thereafter, or contemporaneously therewith, the intermediate substrate 184 is coupled to the upper surface of the L-shaped bracket 188. By way of example, and not limitation, screws (not shown) are passed vertically-upward (with respect to FIG. 8) through bore holes in the L-shaped bracket 188, and received in complementary bosses (not visible in the view provided) integral with an underside surface of the intermediate substrate 184. Once the intermediate substrate 184 is properly secured to the platform 162, the seat cushion 182 is coupled to an upper surface of the substrate 184 (unless the cushion 182 and substrate 186 come preassembled as described above), whereas the lower trim shell 186 is coupled to a lower surface of the substrate 184 in opposing spaced-relation to the seat cushion 182. In the illustrated embodiment, the trim shell 186 includes a channel 187 that is sufficiently wide and long to receive therebetween the platform 162 of the base 150 and the downwardly-projecting flanges 189 of the L-shaped bracket 188. The lower trim shell 186 is oriented such that channel 187 partially surrounds the platform 162 and L-shaped bracket 188. The shell 186 is then mechanically coupled to the intermediate substrate 184, for example, via threaded fasteners (not shown), each of which is fed through a respective cup 185 of the lower trim shell 186, passed through one of the four holes in the substrate 184, and is received in a complementary boss (not visible in the view provided) integral with a lower surface of the upper seat cushion 182.

FIG. 8 of the drawings provides a partially-exploded perspective-view illustration of the gaming machine chair 140, depicting the various constituent parts of an exemplary backrest assembly 142 in accordance with the embodiments of the present disclosure. In particular, the exemplary backrest assembly 142 of FIG. 8 includes a backrest or back support 190, a rear trim structure 192, an internal mounting frame 194, a lower trim piece 196 and a speaker package (which is discussed more extensively below). As seen, for example, in FIG. 6, the backrest 190 may comprise an inner cushion 191, such as low-density foam, that is faced with a functional cover 193, such as cloth, leather, a synthetic draping, etc. A speaker grille 198 (FIG. 8) extends across and covers a pair of speaker ports 200 formed in an upper, headrest portion of the backrest 190. The ports 200 allow air and sound to pass through the backrest assembly 142, for example, to a patron seated in the gaming chair 140. A corresponding rear port 201 (visible in FIG. 6) is formed between the rear trim structure 192 and internal mounting frame 194. The rear port 201 equalizes the air pressure of each side of the speaker assembly.

The gaming chair 140 further includes a speaker package that is integrated into the chair backrest assembly 142. In the embodiment illustrated in FIG. 8, for example, the speaker package comprises a bass transducer 210 and a high- and mid-range speaker set 212. Optionally, the speaker package may comprise additional or alternative components, such as a subwoofer or other speaker type. The speaker package (i.e., bass transducer 210 and speaker set 212) is in signaling communication with the gaming machine (e.g., FIG. 1) and/or gaming system (e.g., FIG. 2) to receive command signals therefrom. For example, electrical cabling may be routed from the speaker package inside the backrest assembly 142, down through the L-shaped bracket 188 into the compartment under the seat assembly 144, around the base 150 to the sled 154. The gaming machine (e.g., FIG. 1) and/or gaming system (e.g., FIG. 2) includes hardware and software to produce sound signals which are delivered to the speaker package. The speaker package is generally employed to provide sound effects, game noises, and other acoustic effects for the gaming machine/system. Additional information regarding speaker systems for gaming devices and gaming chairs is disclosed in commonly-assigned U.S. Patent Application Publication No. 2008/0211276 A1, to James M. Rasmussen, filed in the U.S. on Dec. 19, 2007 and entitled "Speaker System for a Gaming Machine," which is incorporated herein by reference in its entirety.

With continuing reference to FIG. 8, the bass transducer 210 includes a front shell 214 and a back shell 216 that are interconnected via a central cylindrical connector 218 (visible in FIG. 6). Cylindrical connector 218 includes a mounting area, such as a speaker cavity, for stowing a speaker 220 inside the bass transducer 210. The front shell 214 includes a planar, generally square-shaped body with an attachment wall 215 projecting generally-vertically upward from an upper end thereof. The back shell 216 is a substantially similar structure and shape relative to the front 214. That is, back shell 216 includes a planar, generally square-shaped body with an attachment wall 217 projecting generally-vertically downward from a lower end thereof. The front and back shells 214, 216 may therefore be considered mirror images of each other. As seen in FIG. 8, for example, the planar bodies of the front and back shells 214, 216 mount to the cylindrical connector 218 such that the attachment walls 215, 217 point in opposite directions. In this example, the front shell 214, back shell 216 and central connector 218 are an integral unit, molded, for example, from a plastic. As described below, the entire speaker package—i.e., bass transducer 210 and speaker set 212, is packaged or "sandwiched" between the backrest 190 and rear trim structure 192.

The representative internal mounting frame 194 featured in the drawings has a polymeric wishbone-shaped body 195 with a forward contoured-face 202 in opposing spaced relation to a rearward contoured-face 204. In the example provided, the thickness and width of the mounting frame 194 varies almost continuously as you traverse the lateral and longitudinal expanse of the polymeric body 195. For instance, an upper-end region 220 of the mounting frame 194 has a first width and a first thickness, whereas a lower-end region 222 of the mounting frame 194 has a second width and a second thickness that is greater than the width and thickness, respectively, of the upper-end region 220. To this regard, an intermediate region 224 of the mounting frame 194, which is located between the upper- and lower-end regions 220, 222, has a third width and a third thickness that is less than the width and thickness, respectively, of both the upper- and lower-end regions 220, 222.

Likewise, the upper-end region 220 can be seen with a first contoured shape in FIG. 8, whereas the lower-end region 222 of the mounting frame 194 has a second contoured shape that is different from the contoured shape of the upper-end region 220. By way of clarification, the first contoured shape of the upper-end region 220 can be seen with a first curvilinear profile having a first set of dimensions, whereas the second contoured shape of the lower-end region 222 comprises a second curvilinear profile having a second set of dimensions that is different from the dimensions of the first curvilinear profile. The contoured shape of the internal mounting frame 194 provides better, more evenly distributed support for the chair backrest 190 due to the complementary curvature. This additional support translates to the players, helping to maintain the players in the gaming chair 140 when it is moving, as described above.

According to some embodiments of the present disclosure, the polymeric wishbone-shaped body 195 has a "honeycombed" infrastructure. That is, the mounting frame body 195 includes an array of internal ribs or dividers that interconnect to collectively define a number of internal compartments. By way of example, a set of vertically-oriented ribs, designated as 226 in FIG. 8, are generally orthogonally oriented with respect to and intersect a set of horizontally-oriented ribs, designated as 228, to collectively define a plurality of generally square-shaped compartments. As can also be seen in FIG. 8, the vertically- and horizontally-oriented ribs 226, 228 each have a variable-thickness such that the forward most edges thereof cooperatively define the forward contoured face 202.

The internal mounting frame 194 is the primary means for supporting and attaching the entire backrest assembly 142 to the platform assembly 146. That is, the backrest 190, rear trim structure 192, lower trim piece 196, and speaker package are all attached to the internal mounting frame 194, which in turn is attached to the platform assembly 146 via the L-shaped bracket 188. The internal mounting frame 194 has a plurality of fastening regions for coupling to the aforementioned components. In some embodiments, each of the fastening regions lies in a respective plane that is different from the other fastening regions. For instance, the mounting frame 194 shown in FIG. 8 has three separate fastening regions—first, second and third fastening regions 230, 232 and 234, respectively, that are integrally formed with the mounting frame body 195. In this example, the first fastening region 230 lies in a first plane; the second fastening region 232 lies in a second plane that is generally parallel to, but offset from the first plane; and the third fastening region 234 lies in a third plane that is generally parallel to, but offset from both the first and second planes. Optionally, the first, second and third planes may be angularly offset from one another.

Additional design features are enabled by the mounting frame 194 of the present disclosure. These optional design features include, but are not limited to, angled alignment features which optimize assembling of the backrest assembly 142 by making the stacking of components and/or the alignment of fastener holes quicker and easier and, thus, more efficient. One such alignment feature includes the integrally-formed, angled aligning surfaces shown in FIG. 8. When the L-shaped bracket 188 is assembled with the mounting frame 194, these angled aligning surfaces mate with and properly orient the L-shaped bracket 188 as it is being stacked on the mounting frame 194, as well as align the fasteners holes in the bracket 188 with the corresponding holes in the mounting frame 194.

The backrest 190, rear trim structure 192, lower trim piece 196, and speaker package are mechanically fastened (e.g., via threaded fasteners) to one or more of the fastening regions of the internal mounting frame 194. In particular, the internal mounting frame 194 defines an elongated slot 236 that is configured to receive the bass transducer 210 such that the transducer 210 seats within the elongated slot 236, and may thereafter be fixed or otherwise coupled to the mounting frame body 195. As seen in FIG. 8, for example, the elongated slot 236 is generally U-shaped, with a semi-circular base having a pair of upwardly and outwardly sloping side walls. The cylindrical connector 218 of the bass transducer 210 provides a complementary mating surface that is received in the U-shaped slot 236. For example, the outer diameter of the cylindrical connector 218 is approximately equal to but slightly less than the lateral width of the U-shaped slot 236 such that the connecter 218 may be inserted into the elongated slot 236 at an upper end of the mounting frame 194, with respect to FIG. 8, and slid downward until the cylindrical connector 218 is seated in and supported on the semi-circular base of the slot 236.

The bass transducer 210 is thereafter coupled to the rearward contoured-face 204 via a threaded fastener received through complementary aligning holes in the downwardly-projecting attachment wall 217 and lower-end region 222. Likewise, the speaker set 212 is then fastened to the rearward contoured-face 204 of the internal mounting frame 194 and the upwardly-projecting attachment wall 215 of the bass transducer 210—e.g., via threaded fasteners received through complementary, aligning holes in the attachment plate 213 and upper-end region 220 of the mounting frame 194. In a similar or alternative fashion, the backrest 190 is then mechanically coupled to the forward contoured-face 202 and the rear trim structure 192 is mechanically coupled to the rearward contoured-face 204 of the mounting frame 194 such that the internal mounting frame 194 and speaker package are sandwiched or enclosed between the backrest 190 and rear trim structure 192.

Turning next to FIG. 9, a front perspective-view illustration of a gaming chair, designated generally as 240 (also referred to herein as "gaming machine chair"), for a wagering game system, wagering game machine, and/or wagering game device is presented in accordance with embodiments of the present disclosure. The gaming chair 240 generally includes a backrest assembly (or "seatback" or "backrest portion") 242 and a seat assembly (or "seat" or "seat portion") 244, both of which are functionally supported by a platform assembly, indicated generally at 246. The platform assembly 246 is fixed to and supported on an optional base plate 264, which, in turn, may be secured directly to or laid on the floor or commensurate support structure beneath the gaming chair 240. The various constituent parts of the gaming chair 240 of FIG. 9 can be modified as described above with respect to the corresponding parts of the gaming chair 140 of FIGS. 5-8. To that end, the gaming chair 240 of FIG. 9 may include any of the options and features, singly and in any combination, that are discussed above with respect the gaming chair 140 of FIGS. 5-8.

Similar to the embodiments presented in FIGS. 5-8, the gaming chair 240 of FIG. 9 is automated such that, in some applications, one or more sections of the gaming chair 240 can be selectively repositioned in conjunction with events occurring during play of a wagering game, for example, to simulate the events in the wagering game. Moreover, the automation of the gaming chair 240 can be employed for other gaming and non-gaming functions. In the illustrated embodiment, for example, the platform assembly 246 may comprise a base, one or more actuators, and a movable shroud 266. Such actuators can take on any of a variety of various configurations, such as, for example, electric motors, pneumatic cylinders, hydraulic cylinders, electric actuators, electromechanical actuators, smart materials, linear actuators, etc.

The actuators can be operatively attached to, and selectively actuable for moving, the gaming chair backrest portion 242, the seat portion 244, and/or the base 246, individually or in any combination. In other words, some chair configurations can be designed with only an automated seat portion, whereas other configurations will include only an automated backrest portion, while other configurations may have a seat portion and a backrest portion that are automated separately, automated as a unitary element, or both. In some embodiments, the actuators respond to signals received by a motion controller (e.g., controller 170 in FIG. 6) from the gaming machine (e.g., gaming terminal 10 of FIG. 1) and/or the gaming system (e.g., FIG. 2). In a gaming chair design using actuators comprising pneumatic cylinders, for example, the actuators expand and contract in a sequence or manner that supports, for example, the desired simulated motion presented during game play or requested by the player. As seen in FIG. 9, for example, the actuators can provide any of a variety of movements, including, but not limited to, heave (upward and downward rectilinear movement), surge (forward and rearward rectilinear movement), sway (lateral rectilinear movement), pitch (rotational movement about a lateral axis), roll (rotational movement about a longitudinal axis), and yaw (rotational movement about a vertical axis). Alternatively, if fewer actuators are provided, the gaming chair 240 would offer fewer DOF. In the illustrated embodiment, the chair 240 is also operable to provide other tactile motions, such as, but not limited to, vibrations, shaking, pulsations, etc.

Optionally, the actuators, which may be game-play based actuators, may also respond to signals from a button panel, joystick, or other player input device on the gaming chair 240 or gaming machine. For instance, in some embodiments, the player, via one or more input devices, can select the intensity of the chair's motion, such as the magnitude of vibrational forces applied to the chair 240 via the actuators, or the range and speed of a rectilinear or rotational movement. Optionally, the player can select the available types of motion—e.g., if the player dislikes swaying and heaving motions, the player can selectively restrict the gaming chair from making those motions. In addition, the player may be allowed to select a home position of the chair—e.g., a preferred seat height and backrest angle. In any of the foregoing options, the player may be required to first be properly seated in the chair, which can be determined in any of the manners discussed below.

The gaming chair 240 includes one or more sensing devices that are operable, independently or through cooperative operation, to detect the position of the player relative to the gaming chair. There are numerous types of sensing devices that can be used, including, for example, acoustic sensing devices, such as ultrasonic sensors, thermal sensing devices, such as infrared sensors, optical sensing devices, such as light- and laser-based sensors, capacitive sensing devices, such as capacitive-based proximity sensors, etc. In the embodiment of FIG. 9, the gaming chair 240 is shown with a plurality of sensors 252A-E mounted to the backrest portion 242. Specifically, a first sensor 252A is mounted to the backrest portion 242, within the lumbar or "lower spine" region, laterally offset to a right side of the gaming chair 240 (from the player's perspective). A second sensor 252B is mounted to the backrest portion 242 within the lumbar region, laterally offset to a left side of the gaming chair 240 (from the player's perspective). A third sensor 252C is mounted to the backrest portion 242 within the thoracic or "upper spine" region, laterally offset to a right side of the gaming chair 240 (from the player's perspective). A fourth sensor 252D is mounted to the backrest portion 242 within the thoracic region, laterally offset to a left side of the gaming chair 240 (from the player's perspective). Finally, a fifth sensor 252E is mounted to the backrest portion 242 within the general proximity of a player's neck or where a player's head would rest on the gaming chair 240, depending for example on the player's height.

Figure 11:
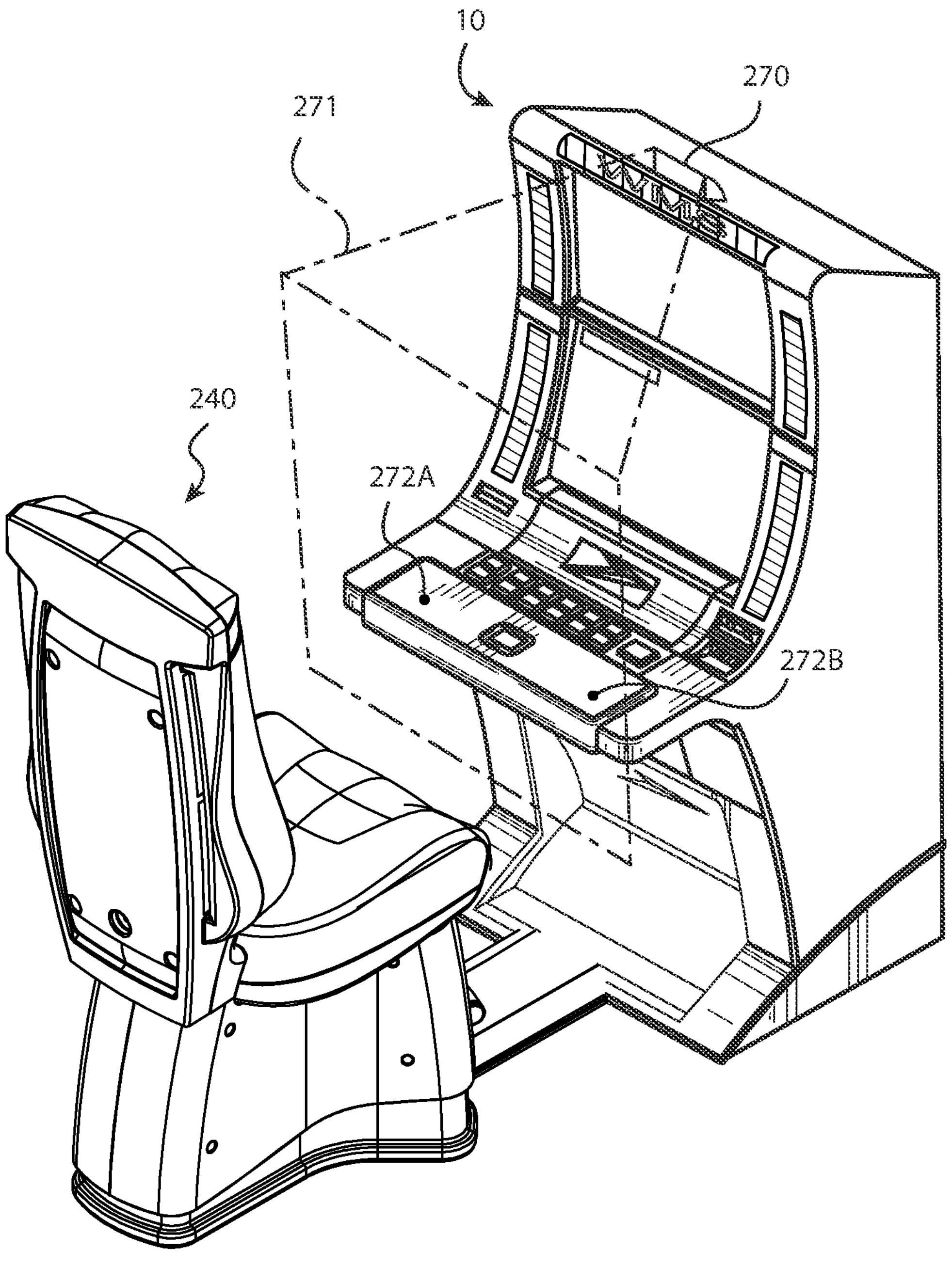
FIG. 11 is a perspective-view illustration of an exemplary gaming machine with a gaming chair in accordance with embodiments of the present disclosure.

In the illustrated embodiment, a plurality of sensors 254A-D is also mounted to the seat portion 244. Specifically, a first sensor 254A is mounted to the seat portion 244 within the buttocks or "rear pelvic" region, laterally offset to a right side of the gaming chair 240 (from the player's perspective). A second sensor 254B is mounted to the seat portion 244 within the buttocks region, laterally offset to a left side of the gaming chair 240 (from the player's perspective). A third sensor 254C is mounted to the seat portion 244 within the hamstring or "right rear femur" region, laterally offset to a right side of the gaming chair 240 (from the player's perspective). In addition, a fourth sensor 254D is mounted to the seat portion 244 within the hamstring or "left rear femur" region, laterally offset to a left side of the gaming chair 240 (from the player's perspective). A sensor 256 can also be mounted to a pivotable armrest 248. Likewise, one or more sensors 258 can also be mounted to a footrest 268. Recognizably, the number and placement of the sensors 252A-E, 254A-D, 256, 258 can be varied from that shown in FIG. 9, for example, to provide a more or less detailed representation of the player's presence and position relative to the gaming chair. For example, as seen in FIG. 11, one or more sensing devices can be mounted to the gaming terminal 10, namely a top-box mounted sensor 270 and first and second button-panel mounted sensors 272A and 272B, respectively.

Each sensor 252A-E, 254A-D, 256, 258 measures a physical characteristic, such as pressure, light reflectance, capacitance, or heat, that is affected by the player's body, and generates a signal indicative of such characteristic. These signals are transmitted to a controller, such as an actuator controller, which accumulates and processes the information. This information can then be analyzed to determine how the player is positioned relative to the gaming chair. For example, the first and second backrest sensors 252A, 252B each determines whether the player, e.g., a respective side of the player's rear lumbar, is pressed against a corresponding lower portion of the backrest 242, and can thereby determine the position of the player, e.g., the player's torso, relative to a lower section of the backrest portion 242. In this regard, the third and fourth backrest sensors 252C, 252D each determines whether the player, e.g., a respective side of the player's thorax, is pressed against a corresponding upper section of the backrest 242, and can thereby determine the position of the player, e.g., the player's torso, relative to an upper section of the backrest portion 242. Moreover, the first and second seat sensors 254A, 254B each determines whether the player, e.g., a respective side of the player's buttocks, is pressed against a corresponding rearward section of the seat 244, and can thereby determine the position of the player, e.g., the player's pelvis, relative to a rearward section of the seat portion 244. The third and fourth seat sensors 254C, 254D each determines whether the player, e.g., a respective one of the player's hamstrings, is pressed against a corresponding forward section of the seat 244, and can thereby determine the position of the player, e.g., the player's legs, relative to a forward section of the seat portion 244.

By analyzing the signals generated by the individual sensors 252A-E, 254A-254D, 256, 258, all of the sensors 252A-E, 254A-254D, 256, 258, or selected groupings of the sensors 252A-E, 254A-254D, 256, 258, the controller can determine how the player is seated in the gaming chair 240. By way of non-limiting example, if the sensors 252A-E and 254A-254D are passive, binary pressure sensors, an active or triggered signal from all of the sensors 252A-E and 254A-254D would indicate that the player is sitting back in the seat with his/her thorax, lumbar, and head pressed against the backrest portion 242 and his/her buttocks and hamstrings pressed against the seat portion 244. Contrastingly, an inactive signal or no signal from the seat sensors 254A-254D or all of the sensors 252A-E and 254A-254D would indicate that no player is sitting in the gaming chair 240. As an extension of this example, active or triggered signals being transmitted by the seat sensors 254A-254D contemporaneously with inactive signals or no signals being transmitted from the backrest sensors 252A-E would indicate that the player is sitting in the gaming chair 240 with his/her buttocks and hamstrings pressed against the seat portion 244 while leaning forward with his/her torso displaced from the backrest portion 242. At the same time, an active or triggered signal from the armrest sensor 248 would indicate that a portion of the player (or a non-player) is resting on the armrest 248, while an active or triggered signal from the footrest sensors 258 would indicate that a portion of the player, e.g., the player's feet, is resting on the footrest 268.

In addition to the foregoing, the controller can also analyze the signals generated by the individual sensors 252A-E, 254A-254D, 256, 258, all of the sensors 252A-E and 254A-254D, or selected groupings of the sensors 252A-E and 254A-254D, to determine whether the player is seated in one of a plurality of predetermined "undesirable" or "objectionable" player positions. By way of non-limiting example, it may be undesirable for a player to sit: (1) with their feet raised and resting on the game console or draped over the side of the gaming chair 240 on the arm rest 248; (2) at the forward edge of the chair seat away from the backrest; or (3) on their knees with their legs on the chair seat. In the embodiment illustrated in FIG. 9, for example, an inactive signal or no signal from the backrest sensors 252A-E and the first and second seat sensors 254A, 254B, in conjunction with an active or triggered signal from the third and fourth seat sensors 254C, 254D can be determined to be an indication that the player is seated away from the backrest portion 242, at the forward edge of the seat portion 244. Likewise, an active or triggered signal from the backrest sensors 252A-E, the seat sensors 254A-254D, and one or more of the button-panel mounted sensors 272A-B, in conjunction with an inactive signal or no signal from the footrest sensors 258 can be determined to be an indication that the player is sitting with their feet raised. Likewise, an active or triggered signal from the seat sensors 254A-254D in conjunction with an inactive signal or no signal from the backrest sensors 252A-E and the footrest sensors 258 can be determined to be an indication that the player is sitting on their knees with their legs on the seat portion 244.

The automated motion of the gaming chair 240 is selectively modified based on the occupant's position and/or movement relative to the gaming chair 240. In some embodiments, the controller limits and/or stops the range of motion within which the actuator(s) can reposition the base, the seat portion, and/or the backrest portion based upon the position of the player as detected by the one or more sensing devices. There are six degrees of freedom (DOF) that can be individually or collectively modified: three rotational motions—i.e., pitch, roll, and yaw, and three translational motions—i.e., heave, sway, and surge. Other motions that can be varied and/or eliminated include vibratory and other haptic motions. In this regard, the relative motion of the constituent portions of the gaming chair can also be selectively modified. In some embodiments, only "low wave" (or "low frequency") motions (i.e., the six DOF identified above) are modified; the tactile motions (e.g., vibration, shaking, pulsations) are not altered in this configuration. In other embodiments, both the low wave motions and the tactile motions are modified. Optionally, the low wave motions and the tactile motions can be varied on a sliding scale. For example, the more a low wave motion is reduced, the more a tactile motion is increased to offset or otherwise compensate for the reduction in low wave motion (and vice versa).

According to some aspects, one or more specific types of chair motion can be modified, limited or eliminated depending on how the player is seated in the gaming chair 240. For instance, if it is determined that the detected position of the player corresponds to one of a plurality of predetermined player positions, such as the "undesirable" or "objectionable" positions identified above, the controller can limit preselected types of gaming chair motion, which have been previously associated with the predetermined player position that corresponds to the detected player position. By way of illustration, and not limitation, prior to the actuators being activated, the controller can analyze the signals received from the various sensors to determine if the player is currently seated at the forward edge of the gaming chair 240. For instance, the signals from one or more of the backrest sensors 252A-E may indicate that the player is distal from both the upper and lower sections of the backrest portion 242, while the signals from one or more of the seat sensors 254A-D indicate that the player is distal from the rearward section of the seat portion 244. If it is determined that the player is seated at the front edge of the chair, the range of pitch motion can be minimized or eliminated to prevent the player from sliding off or being thrown from the gaming chair 240; the range of surge motion can be minimized or eliminated to prevent the player from sliding off or being thrown from the gaming chair 240; and the range of roll motion can be limited or eliminated to reduce lower back discomfort.

In another non-limiting example, the controller can analyze the signals received from the various sensors to determine if the player is seated to one side (i.e., far left or far right) of the gaming chair 240 and/or leaning over the armrest 248. For instance, the first and third seat sensors 254A, 254C, alone or in conjunction with the first and third backrest sensors 252A, 252C, may be emitting an active signal while the second and fourth seat sensors 254B, 254D, alone or in conjunction with the second and fourth backrest sensors 252B, 252D, are emitting an inactive signal (or no signal). Collectively, it can be determined from the foregoing signals that a player is seated in the gaming chair 240, situated to the far right and leaning on their right hamstring. A similar analysis is applicable to determining if the player is seated to the far left of the gaming chair 240 and leaning on their left hamstring. To that end, if the armrest sensor 256 is also emitting an active signal, it can be determined that the player is resting on the armrest 248 while seated to the far left of the gaming chair 240 and leaning on their left hamstring. In response, a range of roll can be minimized or eliminated to prevent the player from being jerked sideways in the chair. Likewise, a range of sway can be minimized or eliminated to prevent the player from being jerked sideways in the chair. Optionally, a range of heave may be limited to reduce lower back discomfort.

In some instances it may be determined that the player is seated in a hazardous manner. In response to the detected position of the player corresponding to one of a plurality of predetermined hazardous positions, the controller can instruct the actuator(s) to stop repositioning the gaming chair. For instance, if the player is sitting on their knees, sitting on the armrest 248, sitting with their legs off the side of the gaming chair 240, seated with their legs up on the gaming terminal 10 or an arm rest 248, etc., the gaming chair 240 can responsively reduce or eliminate all chair motion. Optionally, the player can be notified (e.g., via a display device or speaker) that their current position/orientation may be dangerous or undesirable. To that end, additional feedback may be provided indicating that a "better" or "preferred" position is desired and, optionally, indicating when the player is properly situated in the preferred position. Moreover, the player can be informed that automation of the chair will be limited or restricted until the player moves into a preferred position.

As noted above, the actuators can be driven to selectively reposition the gaming chair 240 (or one or more individual portions thereof) in response to random events occurring in the wagering game so as to simulate the random events. Optionally, the wagering game can be modified to reflect any reduction in the range of motion within which the actuator(s) can reposition the gaming chair 240 (or one or more individual portions thereof). For example, events occurring in the wagering game can be added or eliminated to correspond with restrictions on the automation of the gaming chair 240. In addition, the audio and visual presentation of the wagering game can be modified depending upon the detected position of the player. For example, the sound level of the chair-mounted speaker set 282 can be increased and the screen images decreased if the player is sitting at the front edge of the chair. Antithetically, the sound level of the chair-mounted speaker set 282 can be decreased and the screen images increased if the player is sitting at the back of the chair.

Figure 10:
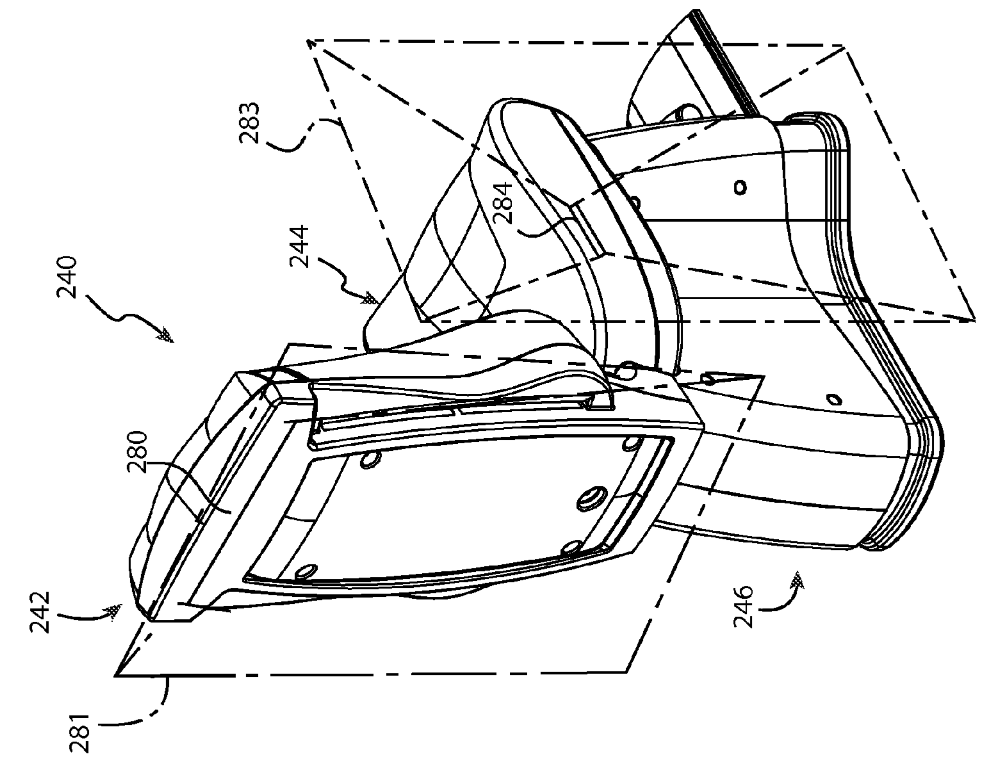
FIG. 10 is a rear perspective-view illustration of a gaming machine chair in accordance with embodiments of the present disclosure.

Turning next to FIGS. 10-11, the gaming chair 240 is shown with one or more additional sensing devices that are operable, independently or through cooperative operation, to detect the position of a non-player relative to the gaming chair 240 and/or the gaming terminal 10. As noted above, there are numerous types of sensing devices that can be used, including, for example, acoustic sensing devices, thermal sensing devices, optical sensing devices, capacitive sensing devices, etc. In the illustrated embodiment, the gaming chair includes one or more sensors 280 that are mounted to a rearward-facing section of the backrest portion 242, and one or more sensors 282 that are mounted to laterally facing sections of the seat portion 244. The rearward-facing sensor(s) 280 is operable to detect the presence and, optionally, the position of a non-player behind the gaming chair 240. The laterally facing sensor(s) 282 is operable to detect the presence and, optionally, the position of a non-player one either side of the gaming chair 240. In a similar regard, the top-box mounted sensor 270 (FIG. 11) can be operable to detect the presence and, optionally, the position of a person in between the gaming chair 240 and the gaming terminal 10. By way of non-limiting example, if the sensors 270, 280 and 282 are infrared proximity sensors, each sensor 270, 280 and 282 generates a respective infrared perimeter, designated 271, 281 and 283, respectively, in FIGS. 10 and 11. If one of the infrared perimeters 271, 281, 283 is breached, the corresponding sensor(s) 270, 280, 282 generates a signal indicative of such breach and, optionally, where the breaching entity lies within the perimeter.

By incorporating non-player sensing devices, such as the rearward-facing sensor 280 and the laterally facing sensor 282, into the gaming chair 240, the controller can reduce or eliminate the range of motion of the gaming chair 240 based on the presence/position of a non-player. For example, if there are non-players in the immediate vicinity of the gaming chair 240 during game play, the controller can responsively reduce or eliminate chair motion in the direction of the non-player. Optionally, the gaming chair 240 and/or gaming terminal 10 can notify the player and/or non-player that the presence or position of the non-player may be dangerous or undesirable. In a similar regard, if the sensors indicate that there are multiple people seated on the gaming chair 240 during game play, the controller can responsively reduce or eliminate all chair motion. Optionally, the gaming chair 240 and/or gaming terminal 10 can notify the player and/or non-player(s) that multiple people being seated on the gaming chair 240 may be dangerous or undesirable.

While many preferred embodiments and best modes for carrying out the present invention have been described in detail above, those familiar with the art to which this invention relates will recognize various alternative designs and embodiments for practicing the invention within the scope of the appended claims.

The invention claimed is:

1. A gaming system for playing a wagering game, the gaming system comprising:

at least one input device configured to receive an indication of a wager to play the wagering game;

at least one display configured to display an outcome of the wagering game, the outcome being randomly determined from a plurality of wagering game outcomes;

a gaming chair including a base portion, a seat portion, and a backrest portion, the seat portion and the backrest portion being supported by the base portion;

at least one actuator operatively attached to the gaming chair, the at least one actuator being operable, in response to events in the wagering game, to selectively reposition at least one of the portions of the gaming chair within a first range of motion;

at least one sensing device operable to detect a position of a player relative to the gaming chair; and at least one controller in operative communication with the at least one actuator and the at least one sensing device, the at least one controller being configured to reduce the first range of motion to a second range of motion within which the at least one actuator can reposition the at least one of the portions of the gaming chair during play of the wagering game based, at least in part, upon the position of the player as detected by the at least one sensing device.

2. The gaming system of claim 1, wherein, in response to the detected position of the player corresponding to at least one of a plurality of predetermined player positions, the at least one controller is further configured to limit preselected types of gaming chair motion associated with the at least one predetermined player position corresponding to the detected player position.

3. A gaming system for playing a wagering game, gaming system comprising:

an input device configured to receive an indication of a wager to play the wagering game;

a display device configured to display an outcome of the wagering game, the outcome being randomly determined from a plurality of wagering game outcomes;

a gaming chair including a base portion, a seat portion, and a backrest portion, the seat portion and the backrest portion being supported by the base portion;

an actuator operatively attached to the gaming chair and operable to selectively reposition at least one of the portions of the gaming chair;

a first sensor configured to detect the position of the player relative to an upper section of the backrest portion;

a second sensor configured to detect the position of the player relative to a lower section of the backrest portion;

a third sensor configured to detect the position of the player relative to a rearward section of the seat portion; and a controller in operative communication with the actuator and the sensors, wherein, in response to the first sensor indicating the player is distal from the upper section of the backrest portion, the second sensor indicating the player is distal from the lower section of the backrest portion, and the third sensor indicating the player is distal from the rearward section of the seat portion, the controller reduces a range of pitch or a range of heave, or both, within which the actuator can reposition the at least one of the portions of the gaming chair.

4. A gaming system for playing a wagering game, the gaming system comprising:

an input device configured to receive an indication of a wager to play the wagering game;

a display device configured to display an outcome of the wagering game, the outcome being randomly determined from a plurality of wagering game outcomes;

a gaming chair including a base portion, a seat portion, and a backrest portion, the seat portion and the backrest portion being supported by the base portion;

an actuator operatively attached to the gaming chair and operable to selectively reposition at least one of the portions of the gaming chair;

a first sensor configured to detect the position of the player relative to a left side of the gaming chair;

a second sensor configured to detect the position of the player relative to a right side of the gaming chair; and a controller in operative communication with the actuator and the sensors, wherein, in response to the first sensor indicating the player is distal from the left side of the gaming chair and the second sensor indicating the player is proximal to the right side of the gaming chair, or the second sensor indicating the player is distal from the right side of the gaming chair and the first sensor indicating the player is proximal to the left side of the gaming chair, the controller reduces a range of roll or a range of sway, or both, within which the actuator can reposition the at least one of the portions of the gaming chair.

5. The gaming system of claim 1, wherein, in response to the detected position of the player corresponding to one of a plurality of predetermined undesirable positions, the at least one controller is further configured to instruct the at least one actuator to stop repositioning the gaming chair.

6. The gaming system of claim 1, wherein the reducing the range of motion includes instructing the at least one actuator to minimize a range of pitch, a range of roll, a range of yaw, a range of heave, a range of sway, or a range of surge, or any combination thereof, within which the at least one actuator can reposition the at least one of the portions of the gaming chair.

7. The gaming system of claim 1, wherein the reducing the range of motion includes instructing the at least one actuator to reduce one of tactile forces and low wave forces applied to the gaming chair, the at least one controller being further configured to instruct the at least one actuator to increase the other one of tactile and low wave forces to at least partially offset the reduction in the one of tactile and low wave forces.

8. A gaming system for playing a wagering game, the gaming system comprising:

an input device configured to receive an indication of a wager to play the wagering game;

a display device configured to display an outcome of the wagering game, the outcome being randomly determined from a plurality of wagering game outcomes;

a gaming chair including a base portion, a seat portion, and a backrest portion, the seat portion and the backrest portion being supported by the base portion;

an actuator operatively attached to the gaming chair and operable to selectively reposition at least one of the portions of the gaming chair;

a first sensing device operable to detect a position of a player relative to the gaming chair;

a second sensing device operable to detect a position of a non-player relative to the gaming chair; and a controller in operative communication with the actuator and the sensing devices, wherein the controller is configured to:

reduce a range of motion within which the actuator can reposition the at least one of the portions of the gamin chair based on the position of the player as detected by the first sensing device, and reduce the range of motion based on the position of the non-player as detected by the second sensing device.

9. A gaming system for playing a wagering game, the gaming system comprising:

an input device configured to receive an indication of a wager to play the wagering game;

at least one game controller operable to conduct aspects of the wagering game;

a display device configured to display an outcome of the wagering game, the outcome being randomly determined from a plurality of wagering game outcomes;

a gaming chair including a base portion, a seat portion, and a backrest portion, the seat portion and the backrest portion being supported by the base portion;

an actuator operatively attached to the gaming chair and operable to selectively reposition at least one of the portions of the gaming chair;

a sensing device operable to detect a position of a player relative to the gaming chair; and a controller in operative communication with the actuator and the sensing device, the at least one controller being configured to reduce a range of motion within which the actuator can reposition the at least one of the portions of the gaming chair based, at least in part, upon the position of the player as detected by the sensing device, wherein, in response to the at least one controller reducing the range of motion within which the at least one actuator can reposition the at least one of the portions of the gaming chair, the at least one game controller being configured to vary events occurring in the wagering game to reflect the reduced range of motion.

10. The gaming system of claim 1, wherein the at least one actuator is operable to selectively reposition the at least one of the portions of the gaming chair in response to events occurring in the wagering game so as to simulate the events.

11. The gaming system of claim 1, wherein the at least one controller is further configured to vary at least one of an audio and a visual presentation of the wagering game depending upon the detected position of the player.

12. A gaming system for playing a wagering game, the gaming system comprising:

at least one input device configured to receive an indication of a wager to play the wagering game;

at least one display configured to display an outcome of the wagering game, the outcome being determined from a plurality of wagering game outcomes;

at least one gaming chair;

at least one actuator operable, in response to events in the wagering game, to selectively reposition at least a portion of the at least one gaming chair within a first range of motion;

at least one sensing device operable to detect a position of a person relative to the at least one gaming chair; and at least one controller in operative communication with the at least one actuator and configured to change the first range of motion to a second range of motion within which the at least one actuator can reposition the portion of the gaming chair during play of the wagering game based, at least in part, upon the position of the person as detected by the at least one sensing device.

13. An automated gaming chair for a gaming system operable to conduct a wagering game, the gaming chair comprising:

a base;

a seat portion supported by the base, the seat portion including at least a first sensing device operable to detect a position of the player relative to the seat portion;

a backrest portion supported by the base, the backrest portion including at least a second sensing device operable to detect a position of the player relative to the backrest portion; and at least one actuator operable to automate movement of the gaming chair in response to events in the wagering game, wherein the at least one actuator is adapted to change at least one range of motion within which the gaming chair is moved during play of the wagering game from a first range of motion to a second range of motion based, at least in part, upon the position of the player as detected by the sensing devices of the seat portion and the backrest portion.

14. The gaming chair of claim 13, wherein, in response to the detected position of the player corresponding to one of a plurality of predetermined player positions, the at least one actuator limits preselected types of gaming chair motion associated with the one of the predetermined player positions corresponding to the detected position.

15. The gaming chair of claim 13, wherein, in response to the detected position of the player corresponding to one of a plurality of predetermined undesirable positions, the at least one actuator stops moving the gaming chair.

16. The gaming chair of claim 13, wherein the limited at least one range of motion includes a range of pitch, a range of roll, a range of yaw, a range of heave, a range of sway, or a range of surge, or any combination thereof.

17. An automated gaming chair for a gaming system operable to conduct a wagering game, the gaming chair comprising:

a base;

a seat portion supported by the base, the seat portion including a first sensing device operable to detect a position of the player relative to the seat portion;

a backrest portion supported by the base, the backrest portion including a second sensing device operable to detect a position of the player relative to the backrest portion; and an actuator operable to automate movement of the gaming chair, wherein the actuator is adapted, in response to signals received from a controller, to limit at least one range of motion within which the gaming chair is moved based, at least in part, upon the position of the player as detected by the sensing devices of the seat portion and the backrest portion, wherein the limiting the at least one range of motion includes reducing one of tactile forces and low wave forces applied to the gaming chair, the actuator increasing the other one of tactile and low wave forces to offset the reduction in the one of tactile and low wave forces.

18. An automated gaming chair for a gaming system operable to conduct a wagering game, the gaming chair comprising:

a base;

a seat portion supported by the base, the seat portion including a first sensing device operable to detect a position of the player relative to the seat portion;

a backrest portion supported by the base, the backrest portion including a second sensing device operable to detect a position of the player relative to the backrest portion;

a third sensing device operable to detect a position of a non-player relative to the gaming chair; and an actuator operable to automate movement of the gaming chair, wherein the actuator is adapted, in response to signals received from a controller, to limit at least one range of motion within which the gaming chair is moved based, at least in part, upon the position of the player as detected by the sensing devices of the seat portion and the backrest portion, wherein the actuator is further adapted to reduce the at least one range of motion based, at least in part, on the position of the non-player as detected by the third sensing device.

19. A gaming machine for playing a wagering game, the gaming machine comprising:

at least one display configured to display outcomes of the wagering game;

at least one input device configured to receive wagers from a player; and a gaming chair including at least one actuator configured to provide movement to the gaming chair in response to events in the wagering game, the gaming chair also including at least one sensor configured to sense a position of the player and output signals indicative thereof, the at least one actuator selectively moving the gaming chair within a first range of motion or a second range of motion distinct from the first range of motion during play of the wagering game based, at least in part, on the output signals from the at least one sensor.

20. The gaming machine of claim 19, wherein a range of motion within which the at least one actuator can selectively move the gaming chair is reduced in response to the output signals from the at least one sensor indicating the player is in at least one of a plurality of predetermined positions.

21. The gaming machine of claim 20, wherein the plurality of predetermined positions includes at least one predefined undesirable position, and wherein the at least one actuator is constrained from selectively moving the gaming chair in response to the output signals from the at least one sensor indicating the player is in the at least one predefined hazardous position.

22. The gaming machine of claim 20, wherein the range of motion includes a range of heave, a range of sway, a range of surge, a range of pitch, a range of roll, or a range of yaw, or any combination thereof.

23. A gaming machine for playing a wagering game, the gaming machine comprising:

a display configured to display outcomes of the wagering game;

an input device configured to receive wagers from a player; and a gaming chair including an actuator configured to provide movement to the gaming chair, the gaming chair also including a sensor configured to sense a position of the player and output signals indicative thereof, the actuator selectively moving the gaming chair based, at least in part, on the output signals from the at least one sensor, wherein a range of motion within which the actuator can selectively move the gaming chair is reduced in response to the output signals from the sensor indicating the player is in at least one of a plurality of predetermined positions, and wherein events occurring in the wagering game are changed to reflect the reduced range of motion.

* * * * *